United States Patent [19]

Gutierrez et al.

[11] Patent Number: 5,268,115
[45] Date of Patent: * Dec. 7, 1993

[54] ALKYL-SUBSTITUTED HYDROXYAROMATIC COMPOUNDS USEFUL AS A MULTIFUNCTIONAL VISCOSITY INDEX IMPROVER

[75] Inventors: Antonio Gutierrez, Mercerville; Robert D. Lundberg, Bridgewater; Won R. Song, Short Hills, all of N.J.

[73] Assignee: Exxon Chemical Patents Inc., Linden, N.J.

[*] Notice: The portion of the term of this patent subsequent to Jul. 7, 2009 has been disclaimed.

[21] Appl. No.: 966,673

[22] Filed: Oct. 26, 1992

Related U.S. Application Data

[63] Continuation of Ser. No. 473,582, Feb. 1, 1990, abandoned.

[51] Int. Cl.$^5$ .......................................... C10M 143/18
[52] U.S. Cl. ........................... 252/51.5 R; 252/515 A; 585/12
[58] Field of Search ....................... 252/51.5 R; 585/12

[56] References Cited

U.S. PATENT DOCUMENTS

| | | | |
|---|---|---|---|
| 3,442,808 | 5/1969 | Traise et al. | 252/49.6 |
| 3,458,495 | 7/1969 | Younghouse et al. | 260/136 |
| 3,787,458 | 1/1974 | Piasek et al. | |
| 3,985,802 | 10/1976 | Piasek et al. | |
| 4,054,422 | 10/1977 | Garth et al. | |
| 4,070,402 | 1/1978 | Karll | 260/619 D |
| 4,354,950 | 10/1982 | Hammond et al. | 252/51.5 A |
| 4,455,244 | 1/1984 | Smyser et al. | |
| 4,463,277 | 10/1990 | Fenoglio et al. | |
| 4,668,834 | 5/1987 | Rim et al. | 585/12 |
| 4,787,996 | 11/1988 | Horodsky et al. | |
| 4,900,427 | 2/1990 | Weers et al. | |
| 4,933,099 | 1/1990 | VerStrate | |
| 4,966,721 | 10/1990 | Farng et al. | |

FOREIGN PATENT DOCUMENTS

| | | |
|---|---|---|
| 128046 | 12/1984 | European Pat. Off. |
| 129368 | 12/1984 | European Pat. Off. |
| 257696 | 3/1988 | European Pat. Off. |
| 0356010 | 2/1990 | European Pat. Off. |
| 2195652 | 3/1974 | France |
| 1497320 | 10/1976 | France |
| 88/01626 | 2/1987 | Japan |

*Primary Examiner*—Prince Willis, Jr.
*Assistant Examiner*—M. Nuzzolillo
*Attorney, Agent, or Firm*—T. V. Kowalchyn

[57] ABSTRACT

An oil-soluble alkyl substituted hydroxyaromatic compound, wherein the alkyl-moiety of the aromatic compounds is derived from at least one ethylene alpha-olefin copolymer of greater or above 25,000 to about 5,000,000 number average molecular weight, said copolymer containing from 30 to 80 weight percent ethylene and wherein at least about 30% of the polymer's chains contain terminal ethenylidene unsaturation. The Mannich Base condensates of this invention are useful as multifunctional viscosity index improvers for oleaginous compositions, particularly lubricating oil compositions.

34 Claims, No Drawings

ALKYL-SUBSTITUTED HYDROXYAROMATIC COMPOUNDS USEFUL AS A MULTIFUNCTIONAL VISCOSITY INDEX IMPROVER

This is a continuation of application Ser. No. 473,582, filed Feb. 1, 1990, and now abandoned.

FIELD OF THE INVENTION

This invention relates to improved oil soluble compositions useful as additives, particularly multifunctional viscosity index improver additives, for oleaginous compositions, including fuel and lubricating oil compositions, and to concentrates containing said additives.

BACKGROUND OF THE INVENTION

U.S. Pat. No. 3,442,808 relates to lubricating oil additives prepared by reacting alkenyl succinic anhydride with the Mannich condensation product prepared by condensing alkyl substituted phenol, formaldehyde and polyalkylene polyamine.

U.S. Pat. No. 3,458,495 relates to oxidation inhibitors and dispersant-detergent oil additives comprising the reaction product of one equivalent of a phosphosulfurized hydrocarbon and about 0.5 to 4 equivalents of an alkylene amino phenol. The phosphosulfurized hydrocarbons are prepared by reacting a terpene, a petroleum fraction or a 500 to 200,000 molecular weight $C_2$ to $C_6$ olefin polymer (including polymers of ethylene, propylene, butylene, isobutylene or isoamylene) and from 5 to 40 wt % of a sulfide of phosphorous. The alkylene amino phenol is prepared by a Mannich Base condensation of aldehyde, alkylene polyamine and alkyl phenol.

U.S. Pat. No. 4,354,950 disloses a method of preparing Mannich base derivatives of hydroxyaryl succinimides of the formula:

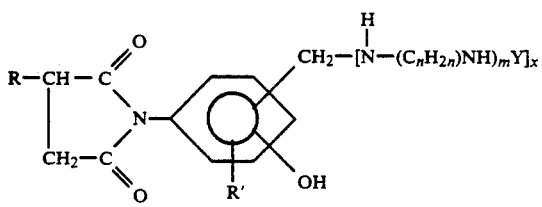

wherein R is hydrocarbyl of 25 to 200 carbon atoms, R' is H, alkyl or halogen, "n" is 2 or 3, "m" has a value of 1 to 5, Y is H or a methylene hydroxyaryl succinimide radical, "x" has a value of 1 to 2 when Y is H and a value of 1 when Y is a methylene hydroxyaryl succinimide radical. The above succinimides are formed in a stepwise reaction, e.g., by reacting a polyalkenyl succinic anhydride with an aminophenol, to produce an intermediate N-(hydroxyaryl) hydrocarbyl succinimide, which is then reacted with an alkylene diamine and an aldehyde (e.g., formaldehyde) in a Mannich base reaction to produce the described succinimides. The described succinimides may be added to a base oil of lubricating viscosity to form lubricant concentrates and lubricating oil formulations.

U.S. Pat. No. 4,668,834 to Uniroyal Chemical discloses preparation and composition of ethylene-alpha olefin copolymers and terpolymers, which are disclosed to be useful as intermediates in epoxy-grafted encapsulation compositions.

Japanese Published Patent Application 87-129,303A of Mitsui Petrochemical relates to narrow molecular weight distribution ($M_w/M_n < 2.5$) ethylene alpha-olefin copolymers containing 85-99 mol % ethylene, which are disclosed to be used for dispersing agents, modifiers or materials to produce toners. The copolymers (having crystallinity of from 5-85%) are prepared in the presence of a catalyst system comprising Zr compounds having at least one cycloalkadienyl group and alumoxane.

European Patent 128,046 discloses (co)polyolefin reactor blends of polyethylene and ethylene higher alpha-olefin copolymers prepared by employing described dual-metallocene/alumoxane catalyst systems.

European Patent Publication 129,368 discloses metallocene/alumoxane catalysts useful for the preparation of ethylene homopolymer and ethylene higher alpha-olefin copolymers.

European Patent Application Publication 257,696 A1 relates to a process for dimerizing alpha-olefins using a catalyst comprising certain metallocene/alumoxane systems.

PCT Published Patent Application WO 88/01626 relates to transition metal compound/alumoxane catalysts for polymerizing alpha-olefins.

SUMMARY OF THE INVENTION

In accordance with one aspect of the present invention, there are provided novel alkylated hydroxy aromatic compounds wherein the alkyl-moiety of the alkyl phenol is derived from at least one terminally unsaturated ethylene alpha-olefin polymer of from greater than 20,000 to about 500,000 number average molecular weight, wherein the terminal unsaturation comprises ethenylidene unsaturation.

In accordance with other aspects of the present invention, an oil-soluble lubricating oil additive is provided which comprises a Mannich Base condensate of an alkyl substituted hydroxy aromatic compound with formaldehyde and an amine, wherein the alkyl-moiety of the aromatic compounds is derived from at least one terminally unsaturated ethylene alpha-olefin copolymer of from greater than 20,000 to about 500,000 number average molecular weight, wherein the terminal unsaturation comprises ethenylidene unsaturation.

The process of this invention permits the preparation of novel oil-soluble Mannich Base condensate lubricating oil additives which are simultaneously characterized by a low concentration of unreacted polymer (usually less than about 40 wt %, e.g., from 5 to 35 wt %) and by advantageous viscosity properties to permit the additives to be readily handled. The present invention can produce such substituted polymers in a highly concentrated form as substantially halogen free materials, thereby reducing the corrositivity processing difficulties and environmental concerns which are associated with halogen-containing lubricating oil additives.

The materials of the invention are different from the prior art Mannich Base materials because of their effectiveness and their ability to provide enhanced lubricating oil dispersancy.

DETAILED DESCRIPTION OF THE INVENTION PREPARATION OF ETHYLENE ALPHA-OLEFIN COPOLYMER

The polymers employed in this invention are the formula $H_2C=CHR^1$ wherein $R^1$ is straight chain or branched chain alkyl radical comprising 1 to 18 carbon atoms and wherein the polymer contains a high degree of terminal ethenylidene unsaturation. Preferably $R^1$ in the above formula is alkyl of from 1 to 8 carbon atoms, and more preferably is alkyl of from 1 to 2 carbon atoms. Therefore, useful comonomers with ethylene in this invention include propylene, 1-butene, hexene-1, octene-1, 4-methylpentene-1, decene-1, dodecene-1, tridecene-1, tetradecene-1, pentadecene-1, hexadecene-1, heptadecene-1, octadecene-1, nonadecene-1 and mixtures thereof (e.g., mixtures of propylene and 1-butene, and the like).

Exemplary of such polymers are ethylene-propylene copolymers, ethylene-butene-1 copolymers and the like. Preferred polymers are copolymers of ethylene and propylene and ethylene and butene-1.

The molar ethylene content of the polymers employed in this invention is preferably in the range of between about 20 and about 80 percent, and more preferably between about 30 and about 70 percent. When propylene and/or butene-1 are employed as comonomer(s) with ethylene, the ethylene content of such copolymers is most preferably between about 45 and about 65 percent, although higher or lower ethylene contents may be present.

The polymers employed in this invention generally possess a number average molecular weight of at least greater (above) than 20,000, preferably at least about 25,000, more preferably at least about 30,000, and most preferably at least about 30,000. Generally, the polymers should not exceed a number average molecular weight of about 500,000, preferably about more preferably about 100,000, and most preferably about 50,000. The number average molecular weight for such polymers can be determined by several known techniques. A convenient method for such determination is by size exclusion chromatography (also known as gel permeation chromatography (GPC)) which additionally provides molecular weight distribution information, see W. W. Yau, J. J. Kirkland and D. D. Bly, "Modern Size Exclusion Liquid Chromatography", John Wiley and Sons, New York, 1979.

The polymers employed in this invention preferably exhibit a degree of crystallinity such that, when functionalized, they are readily soluble in mineral oils.

The polymers employed in this invention are further characterized in that up to about 95% and more of the polymer chains possess terminal ethenylidene-type unsaturation. Thus, one end of such polymers will be of the formula POLY-C($T^1$)=$CH_2$ wherein $T^1$ is $C_1$ to $C_{18}$ alkyl, preferably $C_1$ to $C_8$ alkyl, and more preferably $C_1$ to $C_2$ alkyl, (e.g., methyl or ethyl) and wherein POLY represents the polymer chain. The chain length of the $T^1$ alkyl group will vary depending on the comonomer(s) selected for use in the polymerization. A minor amount of the polymer chains can contain terminal ethenyl unsaturation, i.e. POLY-CH=$CH_2$, and a portion of the polymers can contain internal monounsaturation, e.g. POLY-CH=CH($T^1$), wherein $T^1$ is as defined above.

The polymer employed in this invention comprises polymer chains, at least about 30 percent of which possess terminal ethenylidene unsaturation. Preferably at least about 50 percent, more preferably at least about 60 percent, and most preferably at least about 75 percent (e.g. 75-98%), of such polymer chains exhibit terminal ethenylidene unsaturation. The percentage of polymer chains exhibiting terminal ethenylidene unsaturation may be determined by FTIR spectroscopic analysis, titration, or $C^{13}$NMR.

The polymers employed in this invention may generally be prepared substantially in accordance with the procedures described in U.S. Pat. Nos. 4,752,597, and 4,871,705; in European Patent Publications 128,046 and 129,368; in co-pending Ser. No. 728,111, now abandoned filed Apr. 29, 1985; and copending Ser. No. 93,460 corresponding to U.S. Pat. No. 5,084,530, filed Sep. 10, 1987, the disclosures of all of which are hereby incorporated by reference in their entirety.

The polymers for use in the present invention can be prepared by polymerizing monomer mixtures comprising ethylene in combination with other monomers such as alpha-olefins having from 3 to 20 carbon atoms (and preferably from 3-4 carbon atoms, i.e., propylene, butene-1, and mixtures thereof) in the presence of a catalyst system comprising at least one metallocene (e.g., a cyclopentadienyl-transition metal compound) and an alumoxane compound. The comonomer content can be controlled through the selection of the metallocene catalyst component and by controlling the partial pressure of the various monomers.

The catalysts employed in the production of the reactant polymers are organometallic coordination compounds which are cyclopentadienyl derivatives of a Group 4b metal of the Periodic Table of the Elements (56th Edition of Handbook of Chemistry and Physics, CRC Press [1975]) and include mono, di and tricyclopentadienyls and their derivatives of the transition metals. Particularly desirable are the metallocene of a Group 4b metal such as titanium, zirconium, and hafnium. The alumoxanes employed in forming the reaction product with the metallocenes are themselves the reaction products of an aluminum trialkyl with water.

In general, at least one metallocene compound is employed in the formation of the catalyst. As indicated, supra, metallocene is a metal derivative of a cyclopentadiene. The metallocenes usefully employed in accordance with this invention contain at least one cyclopentadiene ring. The metal is selected from the Group 4b preferably titanium, zirconium, and hafnium, and most preferably hafnium and zirconium. The cyclopentadienyl ring can be unsubstituted or contain one or more substituents (e.g., from 1 to 5 substituents) such as, for example, a hydrocarbyl substituent (e.g., up to 5 $C_1$ to $C_5$ hydrocarbyl substituents) or other substituents, e.g. such as, for example, a trialkyl silyl substituent. The metallocene can contain one, two, or three cyclopentadienyl rings; however, two rings are preferred.

Useful metallocenes can be represented by the general formulas:

      I.

wherein Cp is a cyclopentadienyl ring, M is a Group 4b transition metal, R is a hydrocarbyl group or hydrocarboxy group having from 1 to 20 carbon atoms, X is a halogen, and m is a whole number from 1 to 3, n is a whole number from 0 to 3, and q is a whole number from 0 to 3.

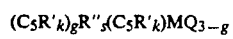      II. and

      III.

wherein ($C_5R'_k$) is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms, a silicon containing hydrocarbyl radical, or hydrocarbyl radicals wherein two carbon atoms are joined together to form a $C_4$-$C_6$ ring, R" is a $C_1$-$C_4$ alkylene radical, a dialkyl germanium or silicon, or a alkyl phosphine or amine radical bridging two ($C_5R'_k$) rings, Q is a hydrocarbyl radical such as aryl, alkyl, alkenyl, alkylaryl, or aryl alkyl radical having from 1-20 carbon atoms, hydrocarboxy radical having from 1-20 carbon atoms or halogen and can be the same or different from each other, $Q_1$ is an alkylidene radical having from 1 to about 20 carbon atoms, s is 0 or 1, g is 0, 1 or 2, s is 0 when g is 0, k is 4 when s is 1, and k is 5 when s is 0, and M is as defined above. Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl and the like. Exemplary silicon containing hydrocarbyl radicals are trimethylsilyl, triethylsilyl and triphenylsilyl. Exemplary halogen atoms include chlorine, bromine, fluorine and iodine and of these halogen atoms, chlorine is preferred. Exemplary hydrocarboxy radicals are methoxy ethoxy, butoxy, amyloxy and the like. Exemplary of the alkylidene radicals is methylidene, ethylidene and propylidene.

Illustrative, but non-limiting examples of the metallocenes represented by Formula I are dialkyl metallocenes such as bis(cyclopentadienyl)titanium dimethyl, bis(cyclopentadienyl)titanium diphenyl, bis(cyclopentadienyl)zirconium dimethyl, bis(cyclopentadienyl)zirconium diphenyl, bis(cyclopentadienyl)hafnium dimethyl and diphenyl, bis(cyclopentadienyl)titanium di-neopentyl, bis(cyclopentadienyl)zirconium di-neopentyl, bis(cyclopentadienyl)titanium dibenzyl, bis(cyclopentadienyl)zirconium dibenzyl, bis(cyclopentadienyl)vanadium dimethyl; the mono alkyl metallocenes such as bis(cyclopentadienyl)titanium methyl chloride, bis(cyclopentadienyl) titanium ethyl chloride bis(cyclopentadienyl)titanium phenyl chloride, bis(cyclopentadienyl)zirconium hydrochloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide, bis(cyclopentadienyl)titanium methyl iodide, bis(cyclopentadienyl)titanium ethyl bromide, bis(cyclopentadienyl) titanium ethyl iodide, bis(cyclopentadienyl)titanium phenyl bromide, bis(cyclopentadienyl)titanium phenyl iodide, bis(cyclopentadienyl)zirconium methyl bromide, bis(cyclopentadienyl)zirconium methyl iodide, bis(cyclopentadienyl)zirconium ethyl bromide. bis(cyclopentadienyl)zirconium ethyl iodide, bis(cyclopentadienyl)zirconium phenyl bromide, bis(cyclopentadienyl)zirconium phenyl iodide; the trialkyl metallocenes such as cyclopentadienyltitanium trimethyl, cyclopentadienyl zirconium triphenyl, and cyclopentadienyl zirconium trineopentyl, cyclopentadienylzirconium trimethyl, cyclopentadienylhafnium triphenyl, cyclopentadienylhafnium trineopentyl, and cyclopentadienylhafnium trimethyl.

Illustrative, but non-limiting examples of II and III metallocenes which can be usefully employed are monocyclopentadienyls titanocenes such as, pentamethylcyclopentadienyl titanium trichloride, pentaethylcyclopentadienyl titanium trichloride, bis(pentamethylcyclopentadienyl) titanium diphenyl, the carbene represented by the formula bis(cyclopentadienyl)titanium=$CH_2$ and derivatives of this reagent such as bis(cyclopentadienyl)Ti=$CH_2$. Al(CH_3)_3, (Cp_2TiCH_2)_2, Cp_2TiCH_2CH(CH_3)CH_2, Cp_2Ti—CH_2CH_2CH_2; substituted bis(Cp)Ti(IV) compounds such as bis(indenyl) titanium diphenyl or dichloride, bis(methylcyclopentadienyl)titanium diphenyl or dihalides; dialkyl, trialkyl, tetra-alkyl and penta-alkyl cyclopentadienyl titanium compounds such as bis(1,2-dimethylcyclopentadienyl)titanium diphenyl or dichloride, bis(1,2-diethylcyclopentadienyl)titanium diphenyl or dichloride and other dihalide complexes; silicon, phosphine, amine or carbon bridged cyclopentadiene complexes, such as dimethylsilyldicyclopentadienyl titanium diphenyl or dichloride, methyl phosphine dicyclopentadienyl titanium diphenyl or dichloride, methylenedicyclopentadienyl titanium diphenyl or dichloride and other complexes described by formulae II and III.

Illustrative but non-limiting examples of the zirconocenes of Formula II and III which can be usefully employed are, pentamethylcyclopentadienyl zirconium trichloride, pentaethylcyclopentadienyl zirconium trichloride, the alkyl substituted cyclopentadienes, such as bis(ethylcyclopentadienyl)zirconium dimethyl, bis(betaphenylpropylcyclopentadienyl) zirconium dimethyl, bis(methylcyclopentadienyl)zirconium dimethyl, bis(n-butylcyclopentadienyl)zirconium dimethyl bis(cyclohexylmethylcyclopentadienyl)zirconium dimethyl bis(n-octylcyclopentadienyl)zirconium dimethyl, and haloalkyl and dihydride, and dihalide complexes of the above; dialkyl, trialkyl, tetraalkyl, and penta-alkyl cyclopentadienes, such as bis(pentamethylcyclopentadienyl)zirconium diphenyl, bis(pentamethylcyclopentadienyl)zirconium dimethyl, bis(1,2-dimethylcyclopentadienyl)zirconium dimethyl and mono and dihalide and hydride complexes of the above; silicon, phosphorus, and carbon bridged cyclopentadiene complexes such as dimethylsilyldicyclopentadienyl zirconium dimethyl, methyl halide or dihalide, and methylene dicyclopentadienyl zirconium dimethyl, methyl halide, or dihalide. Mono, di and tri-silyl substituted cyclopentadienyl compounds such as bis(trimethylsilylcyclopentadienyl)zirconium dichloride and dimethyl bis(1,3-di-trimethylsilylcyclopentadienyl)zirconium dichloride and dimethyl and bis(1,2,4-tri-trimethylsilylcyclopentadienyl)zirconium dichloride and dimethyl. Carbenes represented by the formulae $Cp_2Zr$=$CH_2P(C_6H_5)_2CH_3$, and derivatives of these compounds such as $Cp_2ZrCH_2CH(CH_3)CH_2$.

Mixed cyclopentadienyl metallocene compounds such as cyclopentadienyl (pentamethyl cyclopentadienyl)zirconium dichloride, (1,3-di-trimethylsilylcyclopentadienyl) (pentamethylcyclopentadienyl) zirconium dichloride, and cyclopentadienyl(indenyl) zirconium dichloride can be employed.

Most preferably, the polymers used in this invention are substantially free of ethylene homopolymer.

Bis(cyclopentadienyl)hafnium dichloride, bis(cyclopentadienyl)hafnium; dimethyl, bis(cyclopentadienyl)vanadium dichloride and the like are illustrative of other metallocenes.

Some preferred metallocenes are bis(cyclopentadienyl)zirconium; dimethyl, bis(cyclopentadienyl)zirconium dichloride; bis(cyclopentadienyl)titanium dichloride; bis(methylcyclopentadienyl) zirconium dichloride; bis(methylcyclopentadienyl)titanium dichloride; bis(n-butylcyclopentadienyl)zirconium dichloride; dimethylsilyldicyclopentadienyl zirconium dichloride; bis(trimethylsilycyclopentadienyl)zirconium dichloride; and dimethylsilyldicyclopentadienyl titanium dichloride; bis(indenyl)zirconium dichloride; bis(4,5,6,7- tetrahydroindenyl)zirconium dichloride; the racemic and/or meso isomer of 1,2-ethylene-bridged bis(4,5,6,7-tetrahydroindenyl)zirconium dichloride; the racemic and/or meso isomer of 1,1-dimethylsilyl-bridged bis(4,5,6,7-tetrahydroindenyl)zirconium dichloride; and the racemic and/or meso isomer of 1,1-dimethylsilyl-bridged bis(methylcyclopentadienyl)zirconium dichloride.

The alumoxane compounds useful in the polymerization process may be cyclic or linear. Cyclic alumoxanes may be represented by the general formula $(R-Al-O)_n$ while linear alumoxanes may be represented by the general formula $R(R-Al-O)_{n'}AlR_2$. In the general formula R is a $C_1-C_5$ alkyl group such as, for example, methyl, ethyl, propyl, butyl and pentyl, n is an integer of from 3 to 20, and n' is an integer from 1 to about 20. Preferably, R is methyl and n and n' are 4–18. Generally, in the preparation of alumoxanes from, for example, aluminum trimethyl and water, a mixture of the linear and cyclic compounds is obtained.

The alumoxane can be prepared in various ways. Preferably, they are prepared by contacting water with a solution of aluminum trialkyl, such as, for examples, aluminum trimethyl, in a suitable organic solvent such as toluene or an aliphatic hydrocarbon. For example, the aluminum alkyl is treated with water in the form of a moist solvent. In an alternative method, the aluminum alkyl such as aluminum trimethyl can be desirably contacted with a hydrated salt such as hydrated copper sulfate or ferrous sulfate. Preferably, the alumoxane is prepared in the presence of a hydrated ferrous sulfate. The method comprises treating a dilute solution of aluminum trimethyl in, for example, toluene, with ferrous sulfate represented by the general formula $FeSO_4.7-H_2O$. The ratio of ferrous sulfate to aluminum trimethyl is desirably about 1 mole of ferrous sulfate for 6 to 7 moles of aluminum trimethyl. The reaction is evidenced by the evolution of methane.

The mole ratio of aluminum in the alumoxane to total metal in the metallocenes which can be usefully employed can be in the range of about 0.5:1 to about 1000:1, and desirably about 1:1 to about 100:1. Preferably, the mole ratio will be in the range of 50:1 to about 5:1 and most preferably 20:1 to 5:1.

The solvents used in the preparation of the catalyst system are inert hydrocarbons, in particular a hydrocarbon that is inert with respect to the catalyst system. Such solvents are well known and include, for example, isobutane, butane, pentane, hexane, heptane, octane, cyclohexane, methylcyclohexane, toluene, xylene and the like.

Polymerization is generally conducted at temperatures ranging between about 20° and about 300° C., preferably between about 30° and about 200° C. Reaction time is not critical and may vary from several hours or more to several minutes or less, depending upon factors such as reaction temperature, the monomers to be copolymerized, and the like. One of ordinary skill in the art may readily obtain the optimum reaction time for a given set of reaction parameters by routine experimentation.

The catalyst systems described herein are suitable for the polymerization of olefins in solution over a wide range of pressures. Preferably, the polymerization will be completed at a pressure of from about 10 to about 3,000 bar, and generally at a pressure within the range from about 40 bar to about 2,000 bar, and most preferably, the polymerization will be completed at a pressure within the range from about 50 bar to about 1,500 bar.

After polymerization and, optionally, deactivation of the catalyst (e.g., by conventional techniques such as contacting the polymerization reaction medium with water or an alcohol, such as methanol, propanol, isopropanol, etc., or cooling or flashing the medium to terminate the polymerization reaction), the product polymer can be recovered by processes well known in the art. Any excess reactants may be flashed off from the polymer.

The polymerization may be conducted employing liquid monomer, such as liquid propylene, or mixtures of liquid monomers (such as mixtures of liquid propylene and 1-butene), as the reaction medium. Alternatively, polymerization may be accomplished in the presence of a hydrocarbon inert to the polymerization such as butane, pentane, isopentane, hexane, isooctane, decane, toluene, xylene, and the like.

In those situations wherein the molecular weight of the polymer product that would be produced at a given set of operating conditions is higher than desired, any of the techniques known in the prior art for control of molecular weight, such as the use of hydrogen and/or polymerization temperature control, may be used in the process of this invention. If so desired, the polymerization may be carried out in the presence of hydrogen to lower the polymer molecular weight. Care should be taken to assure that terminal ethenylidene unsaturation is not reduced to less than about 30 percent of the polymer chains.

However, the polymers are preferably formed in the substantial absence of added $H_2$ gas, that is, the absence of $H_2$ gas added in amounts effective to substantially reduce the polymer molecular weight. More preferably, the polymerizations will be conducted employing less than 5 wppm, and more preferably less than 1 wppm, of added H2 gas, based on the moles of the ethylene monomer charged to the polymerization zone.

When carrying out the polymerization in a batch-type fashion, the reaction diluent (if any), ethylene and alpha-olefin comonomer(s) are charged at appropriate ratios to a suitable reactor. Care must be taken that all ingredients are dry, with the reactants typically being passed through molecular sieves or other drying means prior to their introduction into the reactor. Subsequently, either the catalyst and then the cocatalyst, or first the cocatalyst and then the catalyst are introduced while agitating the reaction mixture, thereby causing polymerization to commence. Alternatively, the catalyst and cocatalyst may be premixed in a solvent and then charged to the reactor. As polymer is being formed, additional monomers may be added to the reactor. Upon completion of the reaction, unreacted monomer and solvent are either flashed or distilled off, if necessary by vacuum, and the low molecular weight copolymer withdrawn from the reactor.

The polymerization may be conducted in a continuous manner by simultaneously feeding the reaction diluent (if employed), monomers, catalyst and cocatalyst to a reactor and withdrawing solvent, unreacted monomer and polymer from the reactor so as to allow a residence time of ingredients long enough for forming polymer of the desired molecular weight and separating the polymer from the reaction mixture.

HYDROXYAROMATIC COMPOUNDS

The hydroxy aromatic compounds useful in the preparation of the alkylated materials of this invention include those compounds having the Formula (IIIa):

H—Ar—(OH)$_c$ wherein Ar represents

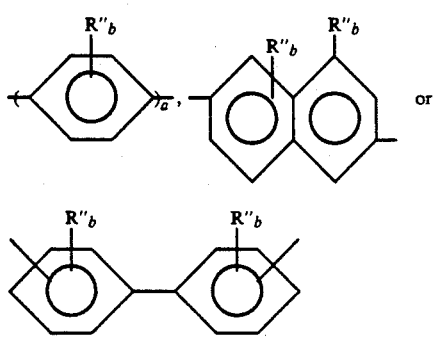

wherein a is 1 or 2, R" is independently a halogen radical such as the bromide or chloride radical, or a hydrocarbyl radical containing from 1 to about 10 carbon atoms, preferably an alkyl radical containing from 1 to about 10 carbon atoms, b is independently an integer from 0 to 2, and c is an integer from 1 to 2.

Illustrative of such Ar groups are phenylene, biphenylene, naphthylene and the like.

PREPARATION OF THE ALKYLATED HYDROXYAROMATIC COMPOUNDS

The selected ethylene alpha-olefin polymer and hydroxy aromatic compound are contacted in the presence of a catalytically effective amount of at least one acidic alkylation catalyst under conditions effective to alkylate the aromatic group of the hydroxy aromatic compound. The alkylation catalyst is conventional and can comprise inorganic acids such as $H_3PO_4$, $H_2SO_4$, HF, $BF_3$, HF—$BF_3$ and the like. The acid catalyst can also comprise an acidic ion exchange resin having acidic groups adsorbed or absorbed thereon, such as Amberlyst 15 resin (Rohm & Haas Co.), and the like. Also useful as catalysts are preformed complexes (or complexes formed in situ) of the foregoing with $C_2$ to $C_{10}$ ethers, $C_1$ to $C_{10}$ alcohols, $C_2$ to $C_{10}$ ketones, phenols and the like, such as $BF_3$ complexed with dimethyl ether, diethyl ether, phenol, and the like.

The hydroxy aromatic compound and polymer will be generally contacted in a ratio of from about 0.1 to 10, preferably from about 1 to 7, more preferably from about 2 to 5, moles of the aromatic compound per mole of the polymer. The selected acid catalyst can be employed in widely varying concentrations. Generally, when the acid catalyst comprises an inorganic catalyst, the acid catalyst will be charged to provide at least about 0.001, preferably from about 0.01 to 0.5, more preferably from about 0.1 to 0.3, moles of catalyst per mole of hydroxy aromatic compound charged to the alkylation reaction zone. Use of greater than 1 mole of the inorganic catalyst per mole of hydroxy aromatic compound is not generally required. When the acid catalyst comprises a supported catalyst, such as an acidic ion exchange resin, the reactants can be contacted with the ion exchange resin employing any conventional solid-liquid contacting techniques, such as by passing the reactants through the resin (e.g., in a catalyst bed or through a membrane impregnated or otherwise containing the resin catalyst) and the upper limit on the moles of catalyst employed per mole of hydroxy aromatic compound is not critical.

The temperature for alkylation can also vary widely, and will usually range from about 20° to 250° C., preferably from about 30° to 150° C., more preferably from about 50° to 80° C.

The alkylation reaction time can vary and will generally be from about 1 to 5 hours, although longer or shorter times can also be employed. The alkylation process can be practiced in a batchwise, continuous or semicontinuous manner. Preferably, the acid catalyst is neutralized and/or removed prior to contacting the alkylation product mixture with the nucleophilic reagent (e.g., polyamine) and aldehyde reactant. The neutralization can be accomplished by contacting the crude alkylation product with gaseous ammonia or other basically reacting compound (e.g., aqueous NaOH, KOH, and the like), followed by filtration to remove any precipitated neutralized catalyst solids.

Alkylation processes of the above types are known and are described, for example, in U.S. Pat. Nos. 3,539,633 and 3,649,229, the disclosures of which are hereby incorporated by reference.

It will be understood that the ethylene alpha-olefin polymers of this invention which are charged to the alkylation reaction zone can be charged alone or together with (e.g., in admixture with) other polyalkenes derived alkenes having from 1 to 20 carbon atoms (butene, pentene, octene, decene, dodecene, tetradodecene and the like) and homopolymers of $C_3$ to $C_{10}$, e.g., $C_2$ to $C_5$, monoolefins, and copolymers of $C_2$ to $C_{10}$, e.g., $C_2$ to $C_5$, monoolefins, said additional polymer having a number average molecular weight of at least about 900, and a molecular weight distribution of less than about 4.0, preferably less than about 3.0 (e.g, from 1.2 to 2.8). Preferred such additional olefin polymers comprise a major molar amount of $C_2$ to $C_{10}$, e.g. $C_2$ to $C_5$ monoolefin. Such olefins include ethylene, propylene, butylene, isobutylene, pentene, octene-1, styrene, etc. Exemplary of the additionally charged homopolymers is polypropylene, polyisobutylene, and poly-n-butene the like as well as interpolymers of two or more of such olefins such as copolymers of: ethylene and propylene (prepared by conventional methods other than as described above for the preferred ethylene alpha-olefin copolymers employed in this invention, that is, ethylene-propylene copolymers which are substantially saturated, wherein less than about 10 wt. % of the polymer chains contain ethylenic unsaturation); butylene and isobutylene; propylene and isobutylene; etc. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene: or a copolymer of ethylene, propylene and 1,4-hexadiene; etc. The additional such olefin polymers charged to the alkylation reaction will usually have number average molecular weights of at least about 900, more generally at least about 1,500, more usually at least about 10,000. The upper number average molecular weight of such polymers should generally not exceed about 200,000, preferably about 100,000, and more preferably about 50,000. Particularly useful such additional olefin polymers have number average molecular weights within the range of about 1500 and about 10,000 with approximately one double bond per chain.

An especially useful additional such polymer is polyisobutylene. Preferred are mixtures of such polyisobutylene with ethylene-propylene copolymers wherein at least 30 wt. % of the copolymer chains contain terminal ethenylidene monounsaturation as described above.

The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

THE ALDEHYDE MATERIAL

The aldehyde reactants will generally comprise formaldehyde or paraformaldehyde, although it will be understood that other aldehyde-group containing compounds, such as $C_2$ to $C_{10}$ hydrocarbyl aldehydes (e.g., butyraldehyde, acetaldehyde, propionaldehyde, and the like) can also be employed. A preferred group of aldehyde materials are compounds of the formula: $R^{12}CHO$, wherein $R^{12}$ is H or aliphatic hydrocarbon radical having from 1 to 4 carbon atoms.

AMINE COMPOUNDS

Amine compounds useful as nucleophilic reactants for reaction with the selected ethylene-alpha-olefin polymer and aldehyde materials include mono- and (preferably) polyamines, of about 2 to 60, preferably 2 to 40 (e.g. 3 to 20), total carbon atoms and about 1 to 12, preferably 3 to 12, and most preferably 3 to 9 nitrogen atoms in the molecule. These amines may be hydrocarbyl amines or may be hydrocarbyl amines including other groups, e.g, hydroxy groups, alkoxy groups, amide groups, nitriles, imidazoline groups, and the like. Hydroxy amines with 1 to 6 hydroxy groups, preferably 1 to 3 hydroxy groups are particularly useful. Preferred amines are aliphatic saturated amines, including those of the general formulas:

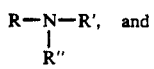 (IV)

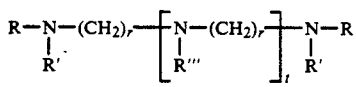 (V)

wherein R, R', R" and R"' are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein R"' can additionally comprise a moiety of the formula:

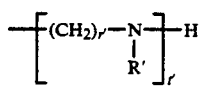 (VI)

wherein R' is as defined above, and wherein r and r' can be the same or a different number of from 2 to 6, preferably 2 to 4; and t and t' can be the same or different and are numbers of from 0 to 10, preferably 2 to 7, and most preferably about 3 to 7, with the proviso that the sum of t and t' is not greater than 15. To assure a facile reaction, it is preferred that R, R', R", R"', r, r', t and t' be selected in a manner sufficient to provide the compounds of Formulas IV and V with typically at least one primary or secondary amine group, preferably at least two primary or secondary amine groups. This can be achieved by selecting at least one of said R, R', R", or R"' groups to be hydrogen or by letting t in Formula V be at least one when R", is H or when the VI moiety possesses a secondary amino group. The most preferred amine of the above formulas are represented by Formula V and contain at least two primary amine groups and at least one, and preferably at least three, secondary amine groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-(1,3-propylene) triamine; N,N-dimethyl-1,3-diaminopropane; N,N-di-(2-aminoethyl) ethylene diamine; N,N-di(2-hydroxyethyl)-1,3-propylene diamine; 3-dodecyloxypropylamine; N-dodecyl-1,3-propane diamine; tris hydroxymethylaminomethane (THAM); diisopropanol amine; diethanol amine; triethanol amine; mono-, di-, and tri-tallow amines; amino morpholines such as N-(3-aminopropyl)morpholine; and mixtures thereof.

Other useful amine compounds include: alicyclic diamines such as 1,4-di(aminomethyl) cyclohexane, and heterocyclic nitrogen compounds such as imidazolines, and N-aminoalkyl piperazines of the general Formula (VII):

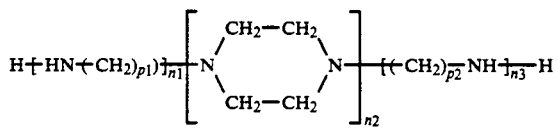

wherein $p_1$ and $p_2$ are the same or different and are each integers of from 1 to 4, and $n_1$, $n_2$ and $n_3$ are the same or different and are each integers of from 1 to 3. Non-limiting examples of such amines include 2-pentadecyl imidazoline; N-(2-aminoethyl) piperazine; etc.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. Low cost poly(ethyleneamines) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the Formula (VIII):

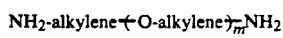

where m has a value of about 3 to 70 and preferably 10 to 35: and the Formula (IX):

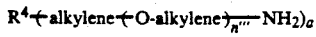

where n''' has a value of about 1 to 40 with the provision that the sum of all the n''' values is from about 3 to about 70 and preferably from about 6 to about 35, and $R^4$ is a polyvalent saturated hydrocarbon radical of up to ten carbon atoms wherein the number of substituents on the $R^8$ group is represented by the value of "a", which is a number of from 3 to 6. The alkylene groups in either Formula (VII) or (IX) may be straight or branched chains containing about 2 to 7, and preferably about 2 to 4 carbon atoms.

The polyoxyalkylene polyamines of formulas (VII) or (IX) above, preferably polyoxyalkylene diamines and polyoxyalkylene triamines, may have average molecular weights ranging from about 200 to about 4000 and preferably from about 400 to about 2000. The preferred polyoxyalkylene polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

A particularly useful class of amines are the polyamido and related amines disclosed in co-pending Ser. No. 126,405, filed Nov. 30, 1987, which comprise reaction products of a polyamine and an alpha, beta unsaturated compound of the formula:

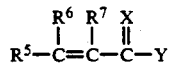 (X)

wherein X is sulfur or oxygen, Y is $-OR^8$, $-SR^8$, or $-NR^8(R^9)$, and $R^5$, $R^6$, $R^7$, $R^8$ and $R^9$ are the same or different and are hydrogen or substituted or unsubstituted hydrocarbyl. Any polyamine, whether aliphatic, cycloaliphatic, aromatic, heterocyclic, etc., can be employed provided it is capable of adding across the acrylic double bond and amidifying with for example the carbonyl group ($-C(O)-$) of the acrylate-type compound of Formula X, or with the thiocarbonyl group ($-C(S)-$) of the thioacrylate-type compound of Formula X.

When $R^5$, $R^6$, $R^7$, $R^8$ or $R^9$ in Formula X are hydrocarbyl, these groups can comprise alkyl, cycloalkyl, aryl, alkaryl, aralkyl or heterocyclic, which can be substituted with groups which are substantially inert to any component of the reaction mixture under conditions selected for preparation of the amido-amine. Such substituent groups include hydroxy, halide (e.g., Cl, Fl, I, Br), $-SH$ and alkylthio. When one or more of $R^5$ through $R^9$ are alkyl, such alkyl groups can be straight or branched chain, and will generally contain from 1 to 20, more usually from 1 to 10, and preferably from 1 to 4, carbon atoms. Illustrative of such alkyl groups are methyl, ethyl, propyl, butyl, pentyl, hexyl, heptyl, octyl, nonyl, decyl, dodecyl, tridecyl, hexadecyl, octadecyl and the like. When one or more of $R^5$ through $R^9$ are aryl, the aryl group will generally contain from 6 to 10 carbon atoms (e.g., phenyl, naphthyl).

When one or more of $R^5$ through $R^9$ are alkaryl, the alkaryl group will generally contain from about 7 to 20 carbon atoms, and preferably from 7 to 12 carbon atoms. Illustrative of such alkaryl groups are tolyl, m-ethylphenyl, o-ethyltolyl, and m-hexyltolyl. When one or more of $R^5$ through $R^9$ are aralkyl, the aryl component generally consists of phenyl or ($C_1$ to $C_6$) alkyl-substituted phenol and the alkyl component generally contains from 1 to 12 carbon atoms, and preferably from 1 to 6 carbon atoms. Examples of such aralkyl groups are benzyl, o-ethylbenzyl, and 4-isobutylbenzyl. When one or more of $R^5$ and $R^9$ are cycloalkyl, the cycloalkyl group will generally contain from 3 to 12 carbon atoms, and preferably from 3 to 6 carbon atoms. Illustrative of such cycloalkyl groups are cyclopropyl, cyclobutyl, cyclohexyl, cyclooctyl, and cyclododecyl. When one or more of $R^5$ through $R^9$ are heterocyclic, the heterocyclic group generally consists of a compound having at least one ring of 6 to 12 members in which one or more ring carbon atoms is replaced by oxygen or nitrogen. Examples of such heterocyclic groups are furyl, pyranyl, pyridyl, piperidyl, dioxanyl, tetrahydrofuryl, pyrazinyl and 1,4-oxazinyl.

The alpha, beta ethylenically unsaturated carboxylate compounds employed herein have the following formula:

 (XI)

wherein $R^5$, $R^6$, $R^7$, and $R^8$ are the same or different and are hydrogen or substituted or unsubstituted hydrocarbyl as defined above. Examples of such alpha, beta-ethylenically unsaturated carboxylate compounds of Formula XI are acrylic acid, methacrylic acid, the methyl, ethyl, isopropyl, n-butyl, and isobutyl esters of acrylic and methacrylic acids, 2-butenoic acid, 2-hexenoic acid, 2-decenoic acid, 3-methyl-2-heptenoic acid, 3-methyl-2-butenoic acid, 3-phenyl-2-propenoic acid, 3-cyclohexyl-2-butenoic acid, 2-methyl-2-butenoic acid, 2-propyl-2-propenoic acid, 2-isopropyl-2-hexenoic acid, 2,3-dimethyl-2-butenoic acid, 3-cyclohexyl-2-methyl-2-pentenoic acid, 2-propenoic acid, methyl 2-propenoate, methyl 2-methyl 2-propenoate, methyl 2-bentenoate, ethyl 2-hexenoate, isopropyl 2-decenoate, phenyl 2-pentenoate, tertiary butyl 2-propenoate, octadecyl 2-propenoate, dodecyl 2-decenoate, cyclopropyl 2,3-dimethyl-2-butenoate, methyl 3-phenyl-2-propenoate, and the like.

The alpha, beta ethylenically unsaturated carboxylate thioester compounds employed herein have the following formula:

 (XII)

wherein $R^5$, $R^6$, $R^7$, and $R^8$ are the same or different and are hydrogen or substituted or unsubstituted hydrocarbyl as defined above. Examples of such alpha, beta-ethylenically unsaturated carboxylate thioesters of Formula XII are methylmercapto 2-butenoate, ethylmercapto 2-hexenoate, isopropylmercapto 2-decenoate, phenylmercapto 2-pentenoate, tertiary butylmercapto 2-propenoate, octadecylmercapto 2-propenoate, dodecylmercapto 2-decenoate, cyclopropylmercapto 2,3-dimethyl-2-butenoate, methylmercapto 3-phenyl-2-propenoate, methylmercapto 2-propenoate, methylmercapto 2-methyl-2-propenoate, and the like.

The alpha, beta ethylenically unsaturated carboxyamide compounds employed herein have the following formula:

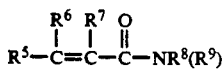 (XIII)

wherein $R^5$, $R^6$, $R^7$, $R^8$ and $R^9$ are the same or different and are hydrogen or substituted or unsubstituted hydrocarbyl as defined above. Examples of alpha, beta-ethylenically unsaturated carboxyamides of Formula XIII are 2-butenamide, 2-hexenamide, 2-decenamide, 3-methyl-2-heptenamide, 3-methyl-2-butenamide, 3-phenyl-2-propenamide, 3-cyclohexyl-2-butenamide, 2-methyl-2-butenamide, 2-propyl-2-propenamide, 2-isopropyl-2-hexenamide, 2,3-dimethyl-2-butenamide, 3-cyclohexyl- 2-methyl-2-pentenamide, N-methyl 2-butenamide, N,N-diethyl 2-hexenamide, N-isopropyl 2-decenamide, N-phenyl 2-pentenamide, N-tertiary butyl 2-propenamide, N-octadecyl 2-propenamide, N-N-didodecyl 2-decenamide, N-cyclopropyl 2,3-dimethyl-2-butenamide, N-methyl 3-phenyl-2-propenamide, 2-propenamide, 2-methyl-2-propenamide, 2-ethyl-2-propenamide and the like.

The alpha, beta ethylenically unsaturated thiocarboxylate compounds employed herein have the following formula:

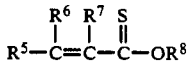 (XIV)

wherein $R^5$, $R^6$, $R^7$, $R^8$ and $R^9$ are the same or different and are hydrogen or substituted or unsubstituted hydrocarbyl as defined above. Examples of alpha, beta-ethylenically unsaturated thiocarboxylate compounds of Formula XIV are 2-butenthioic acid, 2-hexenthioic acid, 2-decenthioic acid, 3-methyl-2-heptenthioic acid, 3-methyl-2-butenthioic acid, 3-phenyl-2-propenthioic acid, 3-cyclohexyl-2-butenthioic acid, 2-methyl-2-butenthioic acid, 2-propyl-2-propenthioic acid, 2-isopropyl-2-hexenthioic acid, 2,3-dimethyl-2-butenthioic acid, 3-cyclohexyl-2-methyl-2-pententhioic acid, 2-propenthioic acid, methyl 2-propenthioate, methyl 2-methyl 2-propenthioate, methyl 2-butenthioate, ethyl 2-hexenthioate, isopropyl 2-decenthioate, phenyl 2-pententhioate, tertiary butyl 2-propenthioate, octadecyl 2-propenthioate, dodecyl 2-decenthioate, cyclopropyl 2,3-dimethyl-2-butenthioate, methyl 3-phenyl-2-propenthioate, and the like.

The alpha, beta ethylenically unsaturated dithioic acid and acid ester compounds employed herein have the following formula:

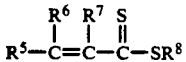 (XV)

wherein $R^5$, $R^6$, $R^7$, and $R^8$ are the same or different and are hydrogen or substituted or unsubstituted hydrocarbyl as defined above. Examples of alpha, beta-ethylenically unsaturated dithioic acids and acid esters of Formula XV are 2-butendithioic acid, 2-hexendithioic acid, 2-decendithioic acid, 3-methyl-2-heptendithioic acid, 3-methyl-2-butendithioic acid, 3-phenyl-2-propendithioic acid, 3-cyclohexyl-2-butendithioic acid, 2-methyl-2-butendithioic acid, 2-propyl-2-propendithioic acid, 2-isopropyl-2-hexendithioic acid, 2,3-dimethyl-2-butendithioic acid, 3-cyclohexyl-2-methyl-2-pentendithioic acid, 2-propendithioic acid, methyl 2-propendithioate, methyl 2-methyl 2-propendithioate, methyl 2-butendithioate, ethyl 2-hexendithioate, isopropyl 2-decendithioate, phenyl 2-pentendithioate, tertiary butyl 2-propendithioate, octadecyl 2-propendithioate, dodecyl 2-decendithioate, cyclopropyl 2,3-dimethyl-2-butendithioate, methyl 3-phenyl-2-propendithioate, and the like.

The alpha, beta ethylenically unsaturated thiocarboxyamide compounds employed herein have the following formula:

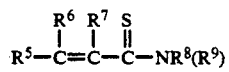 (XVI)

wherein $R^5$, $R^6$, $R^7$, $R^8$ and $R^9$ are the same or different and are hydrogen or substituted or unsubstituted hydrocarbyl as defined above. Examples of alpha, beta-ethylenically unsaturated thiocarboxyamides of Formula XVI are 2-butenthioamide, 2-hexenthioamide, 2-decenthioamide, 3-methyl-2-heptenthioamide, 3-methyl-2-butenthioamide, 3-phenyl-2-propenthioamide, 3-cyclohexyl-2-butenthioamide, 2-methyl-2-butenthioamide, 2-propyl-2-propenthioamide, 2-isopropyl-2-hexenthioamide, 2,3-dimethyl-2-butenthioamide, 3-cyclohexyl-2-methyl-2-pententhioamide, N-methyl 2-butenthioamide, N,N-diethyl 2-hexenthioamide, N-isopropyl 2-decenthioamide, N-phenyl 2-pententhioamide, N-tertiary butyl 2-propenthioamide, N-octadecyl 2-propenthioamide, N-N-didodecyl 2-decenthioamide, N-cyclopropyl 2,3-dimethyl-2-butenthioamide, N-methyl 3-phenyl-2-propenthioamide, 2-propenthioamide, 2-methyl-2-propenthioamide, 2-ethyl-2-propenthioamide and the like.

Preferred compounds for reaction with the polyamines in accordance with this invention are lower alkyl esters of acrylic and (lower alkyl) substituted acrylic acid. Illustrative of such preferred compounds are compounds of the formula:

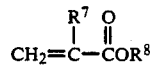 (XVII)

where $R^7$ is hydrogen or a $C_1$ to $C_4$ alkyl group, such as methyl, and $R^8$ is hydrogen or a $C_1$ to $C_4$ alkyl group, capable of being removed so as to form an amido group, for example, methyl, ethyl, propyl, isopropyl, butyl, sec-butyl, tert-butyl, aryl, hexyl, etc. In the preferred embodiments these compounds are acrylic and methacrylic esters such as methyl or ethyl acrylate, methyl or ethyl methacrylate. When the selected alpha, beta-unsaturated compound comprises a compound of Formula X wherein X' is oxygen, the resulting reaction product with the polyamine contains at least one amido linkage (—C(O)N<) and such materials are herein termed "amido-amines." Similarly, when the selected alpha, beta unsaturated compound of Formula X comprises a compound wherein X' is sulfur, the resulting reaction product with the polyamine contains thioamide linkage (—C(S)N<) and these materials are herein termed "thioamido-amines." For convenience, the following discussion is directed to the preparation and use of amido-amines, although it will be understood that such discussion is also applicable to the thioamido-amines.

The type of amido-amine formed varies with reaction conditions. For example, a more linear amido-amine is formed where substantially equimolar amounts of the unsaturated carboxylate and polyamine are reacted. The presence of excesses of the ethylenically unsaturated reactant of Formula X tends to yield an amido-amine which is more cross-linked than that obtained where substantially equimolar amounts of reactants are employed. Where for economic or other reasons a cross-linked amido-amine using excess amine is desired, generally a molar excess of the ethylenically unsaturated reactant of about at least 10%, such as 10–300%, or greater, for example, 25–200%, is employed. For more efficient cross-linking an excess of carboxylated material should preferably be used since a cleaner reaction ensues. For example, a molar excess of about 10–100% or greater such as 10–50%, but preferably an excess of 30–50%, of the carboxylated material. Larger excess can be employed if desired.

In summary, without considering other factors, equimolar amounts of reactants tend to produce a more linear amido-amine whereas excess of the Formula XII reactant tends to yield a more cross-linked amido-amine. It should be noted that the higher the polyamine (i.e., in greater the number of amino groups on the molecule) the greater the statistical probability of cross-linking since, for example, a tetraalkylenepentamine, such as tetraethylene pentamine

has more labile hydrogens than ethylene diamine.

These amido-amine adducts so formed are characterized by both amido and amino groups, as represented, for example, by the following formula

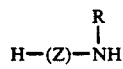

wherein Z may be represented by units of the following idealized Formula (XVIII):

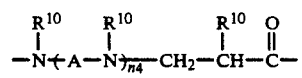

wherein the $R^{10}$s, which may be the same or different, are hydrogen or a substituted group, such as a hydrocarbon group, for example, alkyl, alkenyl, alkynyl, aryl, etc., and A is a moiety of the polyamine which, for example, may be aryl, cycloalkyl, alkyl, etc., and $n_4$ is an integer such as 1–10 or greater.

The above simplified formula represents a linear amido-amine polymer. However, cross-linked polymers may also be formed by employing certain conditions since the polymer has labile hydrogens which can further react with either the unsaturated moiety by adding across the double bond or by amidifying with a carboxylate group.

Preferably, however, the amido-amines employed in this invention are not cross-linked to any substantial degree, and more preferably are substantially linear.

Preferably, the polyamine reactant contains at least one primary amine (and more preferably from 2 to 4 primary amines) group per molecule, and the polyamine and the unsaturated reactant of Formula X are contacted in an amount of from about 1 to 10, more preferably from about 2 to 6, and most preferably from about 3 to 5, equivalents of primary amine in the polyamine reactant per mole of the unsaturated reactant of Formula X.

The reaction between the selected polyamine and acrylate-type compound is carried out at any suitable temperature. Temperatures up to the decomposition points of reactants and products can be employed. In practice, one generally carries out the reaction by heating the reactants below 100 C, such as 80°–90° C., for a suitable period of time, such as a few hours. Where an acrylic-type ester is employed, the progress of the reaction can be judged by the removal of the alcohol in forming the amide. During the early part of the reaction, alcohol is removed quite readily below 100° C. in the case of low boiling alcohols such as methanol or ethanol. As the reaction slows, the temperature is raised to push the polymerization to completion and the temperature may be raised to 150° C. toward the end of the reaction. Removal of alcohol is a convenient method of judging the progress and completion of the reaction which is generally continued until no more alcohol is evolved. Based on removal of alcohol, the yields are generally stoichiometric. In more difficult reactions, yield of at least 95% are generally obtained.

Similarly, it will be understood that the reaction of an ethylenically unsaturated carboxylate thioester of Formula XII liberates the corresponding $HSR^8$ compound (e.g., $H_2S$ when $R^8$ is hydrogen) as a by-product, and the reaction of an ethylenically unsaturated carboxyamide of Formula XIII liberates the corresponding $HNR^8(R^9)$ compound (e.g., ammonia when $R^8$ and $R^9$ are each hydrogen) as by-product.

The reaction time to form an amido-amine material can vary widely depending on a wide variety of factors. For example, there is a relationship between time and temperature. In general, lower temperature demands longer times. Usually, reaction times of from about 2 to 30 hours, such as 5 to 25 hours, and preferably 3 to 10 hours will be employed. Although one can employ a solvent, the reaction can be run without the use of any solvent. In fact, where a high degree of cross-linking is desired, it is preferably to avoid the use of a solvent and most particularly to avoid a polar solvent such as water. However, taking into consideration the effect of solvent on the reaction, where desired, any suitable solvent can be employed, whether organic or inorganic, polar or non-polar.

As an example of the amido-amine adducts, the reaction of tetraethylene pentamine (TEPA) with methyl methacrylate can be illustrated as follows:

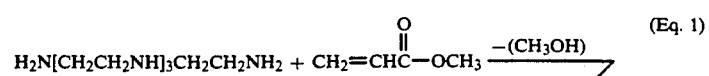

(Eq. 1)

CONDENSATION REACTION

The Mannich Base condensate compositions of this invention are prepared by condensing at least one of the above described alkylated hydroxyaromatic compounds with an amine in the presence of an aldehyde. The reactants are contacted for a time and under conditions sufficient to form the desired dispersant product.

The process employed in the condensation reaction can be any of those disclosed in U.S. Pat. Nos. 3,634,515; 3,649,229; 3,442,808; 3,798,165; 3,798,247; and 3,539,633, the disclosures of which are hereby incorporated by reference in their entirety.

The amount of the reactants employed is not critical and can vary over a wide range. It is, however, preferred to react the alkylated hydroxy aromatic compound, aldehyde reactant and amine compound in the respective molar ratios of about 1:1–4:0.1–10. An excess of aldehyde reactant may be used. The reactions are exothermic, but it is desirable to heat the reaction to a temperature of above about 50° C., preferably in the range of from about 50°-140° C. This additional heating drives the reaction to completion and removes water from the resultant condensation reaction product.

The condensation reaction can be illustrated by the following reactions employing an alkylene polyamine and formaldehyde:

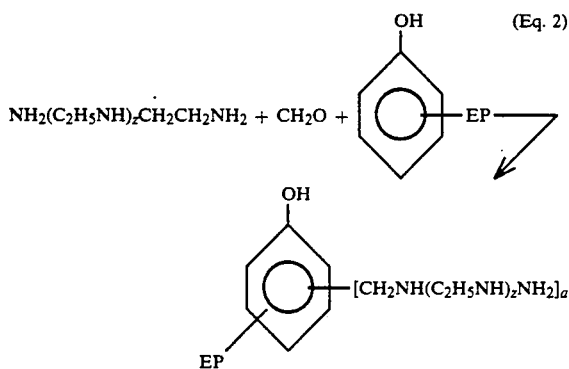

wherein "z" is an integer of from 1 to 10, "a" is an integer of 1 or 2 and "EP" is an ethylene-propylene copolymer as described above, and

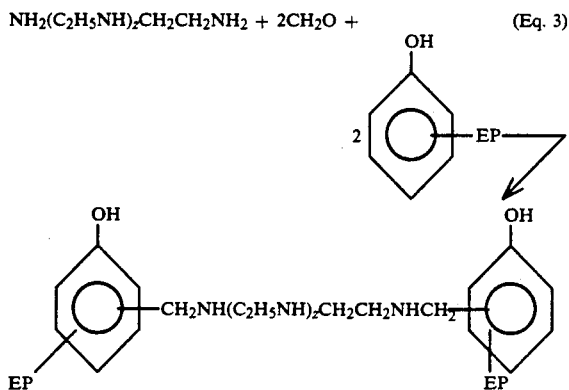

wherein "z", and "EP" are as defined above.

A preferred group of Mannich Base multifunctional viscosity index improvers are those formed by condensing ethylene-propylene copolymer-substituted phenol with formaldehyde and polyethylene amines, e.g., tetraethylene pentamine, pentaethylene hexamine, polyoxyethylene and polyoxypropylene amines, e.g., polyoxypropylene diamine, and combinations thereof. One particularly preferred multifunctional viscosity index improver comprises a condensation of (A) ethylene-propylene copolymer-substituted phenol, (B) formaldehyde, (C) a polyoxyalkylene polyamine, e.g., polyoxypropylene diamine, and (D) a polyalkylene polyamine, e.g. polyethylene diamine and tetraethylene pentamine, using about 2 to about 8 moles each of (B) and about 1 to about 4 moles of (C) or (D) per mole of (A).

The reaction product mixture comprising the desired ethylene-alpha-olefin substituted Mannich Base condensation product formed by the process of this invention will generally be present in the condensation reaction product mixture in a concentration of at least about 60 wt % (e.g., from 65 to 95 wt %), more preferably at least about 70 wt %, (e.g. from 75 to 90 wt %).

Another aspect of this invention involves the post treatment of the nitrogen containing multifunctional viscosity index improver materials. The process for post-treating said nitrogen containing multifunctional viscosity index improver materials is analogous to the post-treating processes used with respect to derivatives of conventional ethylene copolymers of the prior art. Accordingly, the same reaction conditions, ratio of reactants and the like can be used.

The nitrogen-containing multifunctional viscosity index improver materials of the instant invention as described above are post-treated by contacting said nitrogen-containing multifunctional viscosity index improver materials with one or more post-treating reagents selected from the group consisting of boron oxide, boron oxide hydrate, boron halides, boron acids, esters of boron acids, carbon disulfide, sulfur, sulfur chlorides, alkenyl cyanides, aldehydes, ketones, urea, thio-urea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyantes, epoxides, episulfides, formaldehyde or formaldehyde-producing compounds plus phenols, and sulfur plus phenols, and $C_1$ to $C_{30}$ hydrocarbyl substituted succinic acids and anhydrides (e.g., succinic anhydride, dodecyl succinic anhydride and the like), fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, and the like.

For example, the nitrogen containing multifunctional viscosity index improvers can be treated with a boron compound selected from the class consisting of boron oxide, boron halides, boron acids and esters of boron acids in an amount to provide from about 0.1 atomic proportion of boron for each mole of said nitrogen composition to about 20 atomic proportions of boron for each atomic proportion of nitrogen of said nitrogen composition. Usefully the borated materials of the invention contain from about 0.05 to 2.0 wt. %, e.g. 0.05 to 0.7 wt. % boron based on the total weight of said borated nitrogen-containing multifunctional viscosity index improver compound. The boron, which appears to be in the product as dehydrated boric acid polymers (primarily $(HBO_2)_3$), is believed to attach to the multifunctional viscosity index improver as amine salts, e.g., the metaborate salt of said amine dispersants.

Treating is readily carried out by adding from about 0.05 to 4, e.g. 1 to 3 wt. % (based on the weight of said nitrogen compound) of said boron compound, preferably boric acid which is most usually added as a slurry to said nitrogen compound and heating with stirring at from about 135° C. to 190°, e.g. 140°-170° C., for from 1 to 5 hours followed by nitrogen stripping at said temperature ranges.

Since post-treating processes involving the use of these post-treating reagents is known insofar as application to high molecular weight nitrogen-containing compounds of the prior art, further descriptions of these processes herein is unnecessary. In order to apply the prior art processes to the compositions of this invention, all that is necessary is that reaction conditions, ratio of reactants, and the like as described in the prior art, be applied to the novel compositions of this invention. The following U.S. patents are expressly incorporated herein by reference for their disclosure of post-treating processes and post-treating reagents applicable to the compositions of this invention: U.S. Pat. Nos. 3,087,936; 3,200,107; 3,254,025; 3,256,185; 3,278,550; 3,281,428; 3,282,955; 3,284,410; 3,338,832; 3,344,069; 3,366,569; 3,373,111; 3,367,943; 3,403,102; 3,428,561; 3,502,677; 3,513,093; 3,533,945; 3,541,012; 3,639,242; 3,708,522; 3,859,318; 3,865,813; 3,470,098; 3,369,021; 3,184,411; 3,185,645; 3,245,908; 3,245,909; 3,245,910; 3,573,205; 3,692,681; 3,749,695; 3,865,740; 3,954,639; 3,458,530; 3,390,086; 3,367,943; 3,185,704; 3,551,466; 3,415,750; 3,312,619; 3,280,034; 3,718,663; 3,652,616; UK pat. No. 1,085,903; UK Pat. No. 1,162,436; U.S. Pat. No. 3,558,743.

The nitrogen containing multifunctional viscosity index improver materials of this invention can also be treated with polymerizable lactones (such as epsilon-caprolactone) to form dispersant adducts having the moiety $-[C(O)(CH_2)_zO]_mH$, wherein z is a number of from 4 to 8 (e.g., 5 to 7) and m has an average value of from about 0 to 100 (e.g., 0.2 to 20). The materials of this invention can be post-treated with a $C_5$ to $C_9$ lactone, e.g., epsilon-caprolactone, by heating a mixture of the multifunctional viscosity index improver material and lactone in a reaction vessel in the absence of a solvent at a temperature of about 50° C. to about 200° C., more preferably from about 75° C. to about 175° C., and most preferably from about 90° C. to about 160° C., for a sufficient period of time to effect reaction. Optionally, a solvent for the lactone, multifunctional viscosity index improver material and/or the resulting adduct may be employed to control viscosity and/or the reaction rates.

In one preferred embodiment, the $C_5$ to $C_9$ lactone, e.g., epsilon-caprolactone, is reacted with a multifunctional viscosity index improver material in a 1:1 mole ratio of lactone to multifunctional viscosity index improver material. In practice, the ratio of lactone to multifunctional viscosity index improver material may vary considerably as a means of controlling the length of the sequence of the lactone units in the adduct. For example, the mole ratio of the lactone to the multifunctional viscosity index improver material may vary from about 10:1 to about 0.1:1, more preferably from about 5:1 to about 0.2:1, and most preferably from about 2:1 to about 0.4:1. It is preferable to maintain the average degree of polymerization of the lactone monomer below about 100, with a degree of polymerization on the order of from about 0.2 to about 50 being preferred, and from about 0.2 to about 20 being more preferred.

Catalysts useful in the promotion of the lactone-multifunctional viscosity index improver material reactions are selected from the group consisting of stannous octanoate, stannous hexanoate, tetrabutyl titanate, a variety of organic based acid catalysts and amine catalysts, as described on page 266, and forward, in a book chapter authored by R. D. Lundberg and E. F. Cox, entitled "Kinetics and Mechanisms of Polymerization: Ring Opening Polymerization", edited by Frisch and Reegen, published by Marcel Dekker in 1969, wherein stannous octanoate is an especially preferred catalyst. The catalyst is added to the reaction mixture at a concentration level of about 50 to about 10,000 parts per weight of catalyst per one million parts of the total reaction mixture.

Exemplary if adducts formed by reaction of dispersant materials of this invention and epsilon-caprolactone are those adducts illustrated by the following equation:

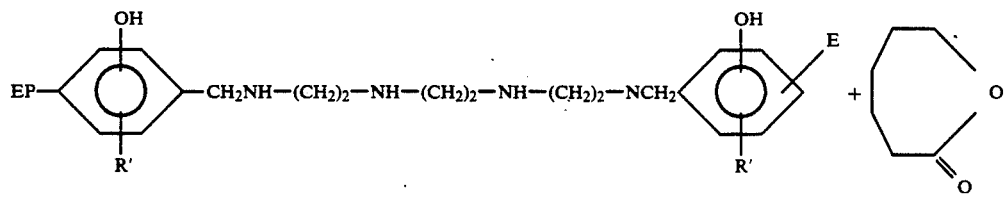

-continued

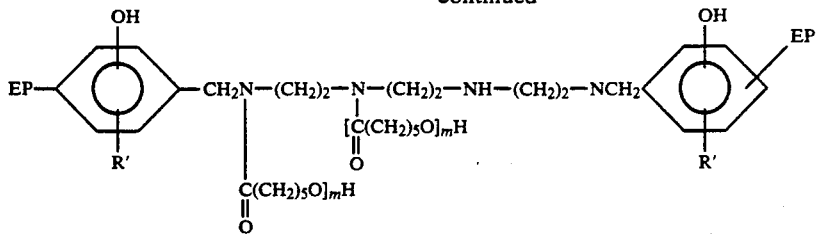

wherein m and EP are as defined above. The reactions of such lactones with multifunctional viscosity index improver materials containing nitrogen or ester groups is more completely described in copending applications Ser. Nos. 916,108; 916,217; 916,218; 916,287; 916,303; 916,113; and 916,114, all filed on Oct. 7, 1986; and copending Ser. No. 178,099 filed on Apr. 6, 1988; the disclosure of each of which is hereby incorporated by reference in its entirety, now U.S. Pat. Nos. 4,906,394, 4,866,141, 4,866,135, 4,866,142, 4,756,032, 4,866,139, 4,963,275, with the exception of U.S. Ser. No. 916,218 which is still pending.

Further aspects of the present invention reside in the formation of metal complexes of the novel multifunctional viscosity index improver additives prepared in accordance with this invention. Suitable metal complexes may be formed in accordance with known techniques of employing a reactive metal ion species during or after the formation of the present multifunctional viscosity index improver materials. Complex forming metal reactants include the metal nitrates, thiocyanates, halides, carboxylates, phosphates, thio-phosphates, sulfates, and borates of transition metals such as iron, cobalt, nickel, copper, chromium, manganese, molybdenum, tungsten, ruthenium, palladium, platinum, cadmium, lead, silver, mercury, antimony and the like. Prior art disclosures of these complexing reactions may be also found in U.S. Pat. Nos. 3,306,908 and Re. 26,433, the disclosures of which are hereby incorporated by reference in their entirety.

The processes of these incorporated patents, as applied to the compositions of this invention, and the post-treated compositions thus produced constitute a further aspect of this invention.

The multifunctional viscosity index improver additives of the present invention can be incorporated into a lubricating oil in any convenient way. Thus, these additives can be added directly to the oil by dispersing or dissolving the same in the oil at the desired level of concentrations of the additive. Such blending into the additional lube oil can occur at room temperature or elevated temperatures. Alternatively, the additives can be blended with a suitable oil-soluble solvent and base oil to form a concentrate, and then blending the concentrate with a lubricating oil basestock to obtain the final formulation. Such multifunctional viscosity index improver concentrates will typically contain (on an active ingredient (A.I.) basis) from about 5 to about 60 wt. %, preferably from about 10 to about 60, and more preferably from about above 20 to about 50 wt. %, multifunctional viscosity index improver additive, and typically from about 40 to 95 wt. %, preferably from about 40 to 80 wt. %, and more preferably from about 50 to about 80 wt. % base oil, based on the concentrate weight. The lubricating oil basestock for the multifunctional viscosity index improver typically is adapted to perform a selected function by the incorporation of additional additives therein to form lubricating oil compositions (i.e., formulations).

LUBRICATING COMPOSITIONS

The additives of the present invention possess very good multifunctional viscosity index improving, e.g., viscosity index improving-dispersant, properties in a wide variety of environments. Accordingly, the additives are used by incorporation and dissolution into an oleaginous material such as fuels and lubricating oils. When the additives of this invention are used in normally liquid petroleum fuels such as middle distillates boiling from about 65° to 430° C., including kerosene, diesel fuels, home heating fuel oil, jet fuels, etc., a concentration of the additives in the fuel in the range of typically from about 0.01 to about 20, and preferably 0.1 to about 15 weight percent, based on the total weight of the composition, will usually be employed.

The additives of the present invention find their primary utility in lubricating oil compositions which employ a base oil in which the additives are dissolved or dispersed. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

These lubricating oil formulations conventionally contain several different types of additives that will supply the characteristics that are required in the formulations. Among these types of additives are included viscosity index improvers, antioxidants, corrosion inhibitors, detergents, dispersants, pour point depressants, antiwear agents, friction modifiers, etc.

In the preparation of lubricating oil formulations it is common practice to introduce the additives in the form of 10 to 80 wt. %, e.g., 20 to 80 wt. % active ingredient concentrates in hydrocarbon oil, e.g. mineral lubricating oil, or other suitable solvent. Usually these concentrates may be diluted with 3 to 100, e.g., 5 to 40 parts by weight of lubricating oil, per part by weight of the additive package, in forming finished lubricants, e.g. crankcase motor oils. The purpose of concentrates, of course, is to make the handling of the various materials less difficult and awkward as well as to facilitate solution or dispersion in the final blend. Thus, a multifunctional viscosity index improver would be usually employed in the form of a 20 to 50 wt. % concentrate, for example, in a lubricating oil fraction.

The multifunctional viscosity index improvers, e.g., viscosity index improvers-dispersants, of the present invention will be generally used in admixture with a lube oil basestock, comprising an oil of lubricating viscosity, including natural and synthetic lubricating oils and mixtures thereof.

Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, the alkyl and aryl ethers of these polyoxyalkylene polymers (e.g., methyl-poly isopropylene glycol ether having an average molecular weight of 1000, diphenyl ether of polyethylene glycol having a molecular weight of 500–1000, diethyl ether of polypropylene glycol having a molecular weight of 1000–1500); and mono- and polycarboxylic esters thereof, for example, the acetic acid esters, mixed $C_3$–$C_8$ fatty acid esters and $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol and tripentaerythritol.

Silicon-based oils such as the polyalkyl-, polyaryl-, polyalkoxy-, or polyaryloxysiloxane oils and silicate oils comprise another useful class of synthetic lubricants; they include tetraethyl silicate, tetraisopropyl silicate, tetra-(2-ethylhexyl)silicate, tetra-(4-methyl-2-ethylhexyl)silicate, tetra-(p-tertbutylphenyl)silicate, hexa-(4-methyl-2-pentoxy)disiloxane, poly(methyl)siloxanes and poly(methylphenyl)siloxanes. Other synthetic lubricating oils include liquid esters of phosphorus-containing acids (e.g., tricresyl phosphate, trioctyl phosphate, diethyl ester of decylphosphonic acid) and polymeric tetrahydrofurans.

Unrefined, refined and rerefined oils can be used in the lubricants of the present invention. Unrefined oils are those obtained directly from a natural or synthetic source without further purification treatment For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Rerefined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products.

Metal containing rust inhibitors and/or detergents are frequently used with ashless dispersants. Such detergents and rust inhibitors include the metal salts of sulphonic acids, alkyl phenols, sulphurized alkyl phenols, alkyl salicylates, naphthenates, and other oil soluble mono- and di-carboxylic acids. Usually these metal containing rust inhibitors and detergents are used in lubricating oil in amounts of about 0.01 to 10, e.g. 0.1 to 5 wt. %, based on the weight of the total lubricating composition. Marine diesel lubricating oils typically employ such metal-containing rust inhibitors and detergents in amounts of up to about 20 wt. %.

Highly basic alkaline earth metal sulfonates are frequently used as detergents. They are usually produced by heating a mixture comprising an oil-soluble sulfonate or alkaryl sulfonic acid, with an excess of alkaline earth metal compound above that required for complete neutralization of any sulfonic acid present and thereafter forming a dispersed carbonate complex by reacting the excess metal with carbon dioxide to provide the desired overbasing. The sulfonic acids are typically obtained by the sulfonation of alkyl substituted aromatic hydrocarbons such as those obtained from the fractionation of petroleum by distillation and/or extraction or by the alkylation of aromatic hydrocarbons as for example those obtained by alkylating benzene, toluene, xylene, naphthalene, diphenyl and the halogen derivatives such as chlorobenzene, chlorotoluene and chloronaphthalene. The alkylation may be carried out in the presence of a catalyst with alkylating agents having from about 3 to more than 30 carbon atoms. For example haloparaffins, olefins obtained by dehydrogenation of paraffins, polyolefins produced from ethylene, propylene, etc. are all suitable. The alkaryl sulfonates usually contain from about 9 to about 70 or more carbon atoms, preferably from about 16 to about 50 carbon atoms per alkyl substituted aromatic moiety.

The alkaline earth metal compounds which may be used in neutralizing these alkaryl sulfonic acids to provide the sulfonates includes the oxides and hydroxides, alkoxides, carbonates, carboxylate, sulfide, hydrosulfide, nitrate, borates and ethers of magnesium, calcium, and barium. Examples are calcium oxide, calcium hydroxide, magnesium acetate and magnesium borate. As noted, the alkaline earth metal compound is used in excess of that required to complete neutralization of the alkaryl sulfonic acids. Generally, the amount ranges from about 100 to 220%, although it is preferred to use at least 125%, of the stoichiometric amount of metal required for complete neutralization.

Various other preparations of basic alkaline earth metal alkaryl sulfonates are known, such as U.S. Pat.

Nos. 3,150,088 and 3,150,089 wherein overbasing is accomplished by hydrolysis of an alkoxide-carbonate complex with the alkaryl sulfonate in a hydrocarbon solvent-diluent oil.

A preferred alkaline earth sulfonate additive is magnesium alkyl aromatic sulfonate having a total base number ranging from about 300 to about 400 with the magnesium sulfonate content ranging from about 25 to about 32 wt. %, based upon the total weight of the additive system dispersed in mineral lubricating oil.

Neutral metal sulfonates are frequently used as rust inhibitors. Polyvalent metal alkyl salicylate and naphthenate materials are known additives for lubricating oil compositions to improve their high temperature performance and to counteract deposition of carbonaceous matter on pistons (U.S. Pat. No. 2,744,069). An increase in reserve basicity of the polyvalent metal alkyl salicylates and naphthenates can be realized by utilizing alkaline earth metal, e.g. calcium, salts of mixtures $C_8$–$C_{26}$ salicylates and phenates (see U.S. Pat. No. 2,744,069) or polyvalent metal salts of alkyl salicyclic acids, said acids obtained from the alkylation of phenols followed by phenation, carboxylation and hydrolysis (U.S. Pat. No. 3,704,315) which could then be converted into highly basic salts by techniques generally known and used for such conversion. The reserve basicity of these metal-containing rust inhibitors is usefully at TBN levels of between about 60 and 150. Included with the useful polyvalent metal salicylate and naphthenate materials are the methylene and sulfur bridged materials which are readily derived from alkyl substituted salicylic or naphthenic acids or mixtures of either or both with alkyl substituted phenols. Basic sulfurized salicylates and a method for their preparation is shown in U.S. Pat. No. 3,595,791. Such materials include alkaline earth metal, particularly magnesium, calcium, strontium and barium salts of aromatic acids having the general formula:

$$HOOC—ArR_1—X_y(ArR_1OH)_n \qquad (XIII)$$

where Ar is an aryl radical of 1 to 6 rings, $R_1$ is an alkyl group having from about 8 to 50 carbon atoms, preferably 12 to 30 carbon atoms (optimally about 12), X is a sulfur (—S—) or methylene (—$CH_2$—) bridge, y is a number from 0 to 4 and n is a number from 0 to 4.

Preparation of the overbased methylene bridged salicylate-phenate salt is readily carried out by conventional techniques such as by alkylation of a phenol followed by phenation, carboxylation, hydrolysis, methylene bridging a coupling agent such as an alkylene dihalide followed by salt formation concurrent with carbonation. An overbased calcium salt of a methylene bridged phenolsalicylic acid of the general Formula (XIV):

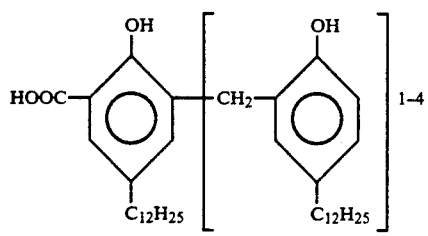

with a TBN of 60 to 150 is highly useful in this invention.

The sulfurized metal phenates can be considered the "metal salt of a phenol sulfide" which thus refers to a metal salt whether neutral or basic, of a compound typified by the general Formula (XV):

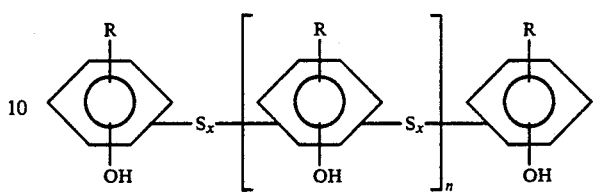

where x=1 or 2, n=0, 1 or 2; or a polymeric form of such a compound, where R is an alkyl radical, n and x are each integers from 1 to 4, and the average number of carbon atoms in all of the R groups is at least about 9 in order to ensure adequate solubility in oil. The individual R groups may each contain from 5 to 40, preferably 8 to 20, carbon atoms. The metal salt is prepared by reacting an alkyl phenol sulfide with a sufficient quantity of metal containing material to impart the desired alkalinity to the sulfurized metal phenate.

Regardless of the manner in which they are prepared, the sulfurized alkyl phenols which are useful generally contain from about 2 to about 14% by weight, preferably about 4 to about 12 wt. % sulfur based on the weight of sulfurized alkyl phenol.

The sulfurized alkyl phenol may be converted by reaction with a metal containing material including oxides, hydroxides and complexes in an amount sufficient to neutralize said phenol and, if desired, to overbase the product to a desired alkalinity by procedures well known in the art. Preferred is a process of neutralization utilizing a solution of metal in a glycol ether.

The neutral or normal sulfurized metal phenates are those in which the ratio of metal to phenol nucleus is about 1:2. The "overbased" or "basic" sulfurized metal phenates are sulfurized metal phenates wherein the ratio of metal to phenol is greater than that of stoichiometric, e.g. basic sulfurized metal dodecyl phenate has a metal content up to and greater than 100% in excess of the metal present in the corresponding normal sulfurized metal phenates wherein the excess metal is produced in oil-soluble or dispersible form (as by reaction with $CO_2$).

Magnesium and calcium containing additives although beneficial in other respects can increase the tendency of the lubricating oil to oxidize. This is especially true of the highly basic sulphonates.

According to a preferred embodiment the invention therefore provides a crankcase lubricating composition also containing from 2 to 8000 parts per million of calcium or magnesium.

The magnesium and/or calcium is generally present as basic or neutral detergents such as the sulphonates and phenates, our preferred additives are the neutral or basic magnesium or calcium sulphonates. Preferably the oils contain from 500 to 5000 parts per million of calcium or magnesium. Basic magnesium and calcium sulphonates are preferred.

Viscosity modifiers impart high and low temperature operability to the lubricating oil and permit it to remain relatively viscous at elevated temperatures and also exhibit acceptable viscosity or fluidity at low temperatures. Viscosity modifiers are generally high molecular weight hydrocarbon polymers including polyesters.

The viscosity modifiers may also be derivatized to include other properties or functions, such as the addition of dispersancy properties. These oil soluble viscosity modifying polymers will generally have number average molecular weights of from $10^3$ to $10^6$, preferably $10^4$ to $10^6$, e.g., 20,000 to 250,000, as determined by gel permeation chromatography or osmometry.

Examples of suitable hydrocarbon polymers include homopolymers and copolymers of two or more monomers of $C_2$ to $C_{30}$, e.g. $C_2$ to $C_8$ olefins, including both alpha olefins and internal olefins, which may be straight or branched, aliphatic, aromatic, alkyl-aromatic, cycloaliphatic, etc. Frequently they will be of ethylene with $C_3$ to $C_{30}$ olefins, particularly preferred being the copolymers of ethylene and propylene. Other polymers can be used such as polyisobutylenes, homopolymers and copolymers of $C_6$ and higher alpha olefins, atactic polypropylene, hydrogenated polymers and copolymers and terpolymers of styrene, e.g. with isoprene and/or butadiene and hydrogenated derivatives thereof. The polymer may be degraded in molecular weight, for example by mastication, extrusion, oxidation or thermal degradation, and it may be oxidized and contain oxygen. Also included are derivatized polymers such as post-grafted interpolymers of ethylene-propylene with an active monomer such as maleic anhydride which may be further reacted with an alcohol, or amine, e.g. an alkylene polyamine or hydroxy amine, e.g. see U.S. Pat. Nos. 4,089,794; 4,160,739; 4,137,185; or copolymers of ethylene and propylene reacted or grafted with nitrogen compounds such as shown in U.S. Pat. Nos. 4,068,056; 4,068,058; 4,146,489 and 4,149,984.

The preferred hydrocarbon polymers are ethylene copolymers containing from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$, more preferably $C_3$ to $C_8$, alpha-olefins. While not essential, such copolymers preferably have a degree of crystallinity of less than 25 wt. %, as determined by X-ray and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl-1-pentene, 4-methyl-1-hexene, 5-methylpentene-1, 4,4-dimethyl-1-pentene, and 6-methylheptene-1, etc., and mixtures thereof.

Terpolymers, tetrapolymers, etc., of ethylene, said $C_{3-28}$ alpha-olefin, and a non-conjugated diolefin or mixtures of such diolefins may also be used. The amount of the non-conjugated diolefin generally ranges from about 0.5 to 20 mole percent, preferably from about 1 to about 7 mole percent, based on the total amount of ethylene and alpha-olefin present.

The polyester V.I. improvers are generally polymers of esters of ethylenically unsaturated $C_3$ to $C_8$ mono- and dicarboxylic acids such as methacrylic and acrylic acids, maleic acid, maleic anhydride, fumaric acid, etc.

Examples of unsaturated esters that may be used include those of aliphatic saturated mono alcohols of at least 1 carbon atom and preferably of from 12 to 20 carbon atoms, such as decyl acrylate, lauryl acrylate, stearyl acrylate, eicosanyl acrylate, docosanyl acrylate, decyl methacrylate, diamyl fumarate, lauryl methacrylate, cetyl methacrylate, stearyl methacrylate, and the like and mixtures thereof.

Other esters include the vinyl alcohol esters of $C_2$ to $C_{22}$ fatty or mono carboxylic acids, preferably saturated such as vinyl acetate, vinyl laurate, vinyl palmitate, vinyl stearate, vinyl oleate, and the like and mixtures thereof. Copolymers of vinyl alcohol esters with unsaturated acid esters such as the copolymer of vinyl acetate with dialkyl fumarates, can also be used.

The esters may be copolymerized with still other unsaturated monomers such as olefins, e.g. 0.2 to 5 moles of $C_2$-$C_{20}$ aliphatic or aromatic olefin per mole of unsaturated ester, or per mole of unsaturated acid or anhydride followed by esterification. For example, copolymers of styrene with maleic anhydride esterified with alcohols and amines are known, e.g., see U.S. Pat. No. 3,702,300.

Such ester polymers may be grafted with, or the ester copolymerized with, polymerizable unsaturated nitrogen-containing monomers to impart dispersancy to the V.I. improvers. Examples of suitable unsaturated nitrogen-containing monomers include those containing 4 to 20 carbon atoms such as amino substituted olefins as p-(betadiethylaminoethyl)styrene; basic nitrogen-containing heterocycles carrying a polymerizable ethylenically unsaturated substituent, e.g. the vinyl pyridines and the vinyl alkyl pyridines such as 2-vinyl-5-ethyl pyridine, 2-methyl-5-vinyl pyridine, 2-vinyl-pyridine, 4-vinylpyridine, 3-vinyl-pyridine, 3-methyl-5-vinyl-pyridine, 4-methyl-2-vinyl-pyridine, 4-ethyl-2-vinyl-pyridine and 2-butyl-1-5-vinyl-pyridine and the like.

N-vinyl lactams are also suitable, e.g. N-vinyl pyrrolidones or N-vinyl piperidones.

The vinyl pyrrolidones are preferred and are exemplified by N-vinyl pyrrolidone, N-(1-methylvinyl) pyrrolidone, N-vinyl-5-methyl pyrrolidone, N-vinyl-3, 3-dimethylpyrrolidone, N-vinyl-5-ethyl pyrrolidone, etc.

Dihydrocarbyl dithiophosphate metal salts are frequently used as anti-wear agents and also provide anti-oxidant activity. The zinc salts are most commonly used in lubricating oil in amounts of 0.1 to 10, preferably 0.2 to 2 wt. %, based upon the total weight of the lubricating oil composition. They may be prepared in accordance with known techniques by first forming a dithiophosphoric acid, usually by reaction of an alcohol or a phenol with $P_2S_5$ and then neutralizing the dithiophosphoric acid with a suitable zinc compound.

Mixtures of alcohols may be used including mixtures of primary and secondary alcohols, secondary generally for imparting improved anti-wear properties, with primary giving improved thermal stability properties. Mixtures of the two are particularly useful. In general, any basic or neutral zinc compound could be used but the oxides, hydroxides and carbonates are most generally employed. Commercial additives frequently contain an excess of zinc due to use of an excess of the basic zinc compound in the neutralization reaction.

The zinc dihydrocarbyl dithiophosphates useful in the present invention are oil soluble salts of dihydrocarbyl esters of dithiophosphoric acids and may be represented by the following formula:

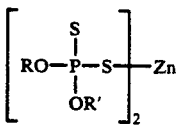

(XVI)

wherein R and R' may be the same or different hydrocarbyl radicals containing from 1 to 18, preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl etc. In order to obtain oil solubility, the total number of carbon atoms (i.e., R and R' in Formula XVI) in the dithiophosphoric acid will generally be about 5 or greater.

The antioxidants useful in this invention include oil soluble copper compounds. The copper may be blended into the oil as any suitable oil soluble copper compound. By oil soluble we mean the compound is oil soluble under normal blending conditions in the oil or additive package. The copper compound may be in the cuprous or cupric form. The copper may be in the form of the copper dihydrocarbyl thio- or dithio-phosphates wherein copper may be substituted for zinc in the compounds and reactions described above although one mole of cuprous or cupric oxide may be reacted with one or two moles of the dithiophosphoric acid, respectively. Alternatively the copper may be added as the copper salt of a synthetic or natural carboxylic acid. Examples include CIO to $C_{18}$ fatty acids such as stearic or palmitic, but unsaturated acids such as oleic or branched carboxylic acids such as napthenic acids of molecular weight from 200 to 500 or synthetic carboxylic acids are preferred because of the improved handling and solubility properties of the resulting copper carboxylates. Also useful are oil soluble copper dithiocarbamates of the general formula $(RR'NCSS)_nCu$, where n is 1 or 2 and R and R' are the same or different hydrocarbyl radicals containing from 1 to 18 and preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e, R and R') will generally be about 5 or greater. Copper sulphonates, phenates, and acetylacetonates may also be used.

Exemplary of useful copper compounds are copper ($Cu^I$ and/or $Cu^{II}$) salts of alkenyl succinic acids or anhydrides. The salts themselves may be basic, neutral or acidic. They may be formed by reacting (a) any of the materials discussed above in the Ashless Dispersant section, which have at least one free carboxylic acid (or anhydride) group with (b) a reactive metal compound. Suitable acid (or anhydride) reactive metal compounds include those such as cupric or cuprous hydroxides, oxides, acetates, borates, and carbonates or basic copper carbonate.

Examples of the metal salts of this invention are Cu salts of polyisobutenyl succinic anhydride (hereinafter referred to as Cu-PIBSA), and Cu salts of polyisobutenyl succinic acid. Preferably, the selected metal employed is its divalent form, e.g., $Cu^{+2}$. The preferred substrates are polyalkenyl succinic acids in which the alkenyl group has a molecular weight greater than about 700. The alkenyl group desirably has a $M_n$ from about 900 to 1400, and up to 2500, with a $M_n$ of about 950 being most preferred. Especially preferred, of those listed above in the section on Dispersants, is polyisobutylene succinic acid (PIBSA). These materials may desirably be dissolved in a solvent, such as a mineral oil, and heated in the presence of a water solution (or slurry) of the metal bearing material. Heating may take place between 70° and about 200° C. Temperatures of 110° to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-PIBSA, Cu-oleate, or mixtures thereof) will be generally employed in an amount of from about 50-500 ppm by weight of the metal, in the final lubricating or fuel composition.

The copper antioxidants used in this invention are inexpensive and are effective at low concentrations and therefore do not add substantially to the cost of the product. The results obtained are frequently better than those obtained with previously used antioxidants, which are expensive and used in higher concentrations. In the amounts employed, the copper compounds do not interfere with the performance of other components of the lubricating composition, in many instances, completely satisfactory results are obtained when the copper compound is the sole antioxidant in addition to the ZDDP. The copper compounds can be utilized to replace part or all of the need for supplementary antioxidants. Thus, for particularly severe conditions it may be desirable to include a supplementary, conventional antioxidant. However, the amounts of supplementary antioxidant required are small, far less than the amount required in the absence of the copper compound.

While any effective amount of the copper antioxidant can be incorporated into the lubricating oil composition, it is contemplated that such effective amounts be sufficient to provide said lube oil composition with an amount of the copper antioxidant of from about 5 to 500 (more preferably 10 to 200, still more preferably 10 to 180, and most preferably 20 to 130 (e.g., 90 to 120)) part per million of added copper based on the weight of the lubricating oil composition. Of course, the preferred amount may depend amongst other factors on the quality of the basestock lubricating oil.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 weight percent of a sulfide of phosphorus for ½ to 15 hours, at a temperature in the range of 65° to 315° C. Neutralization of the phosphosulfurized hydrocarbon may be effected in the manner taught in U.S. Pat. No. 1,969,324.

Oxidation inhibitors reduce the tendency of mineral oils to deteriorate in service which deterioration can be evidenced by the products of oxidation such as sludge and varnish-like deposits on the metal surfaces and by viscosity growth. Such oxidation inhibitors include alkaline earth metal salts of alkylphenolthioesters having preferably $C_5$ to $C_{12}$ alkyl side chains, calcium nonylphenol sulfide, barium t-octylphenyl sulfide, dioctylphenylamine, phenylalphanaphthylamine, phosphosulfurized or sulfurized hydrocarbons, etc.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate discloses S-carboxy-alkylene hydrocarbyl succinimide, S-carboxyalkylene hydrocarbyl succinamic acid and mixtures thereof; U.S. Pat. No. 3,879,306 which discloses N-(hydroxyalkyl) alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are glycerol mono and dioleates, and succinate esters, or metal salts thereof, of hydrocarbyl substituted succinic acids or anhydrides and thiobis alkanols such as described in U.S. Pat. No. 4,344,853.

Pour point depressants lower the temperature at which the fluid will flow or can be poured. Such depressants are well known. Typical of those additives which usefully optimize the low temperature fluidity of the fluid are $C_8$–$C_{18}$ dialkylfumarate vinyl acetate copolymers, polymethacrylates, and wax naphthalene.

Foam control can be provided by an antifoamant of the polysiloxane type, e.g. silicone oil and polydimethyl siloxane.

Organic, oil-soluble compounds useful as rust inhibitors in this invention comprise nonionic surfactants such as polyoxyalkylene polyols and esters thereof, and anionic surfactants such as salts of alkyl sulfonic acids. Such anti-rust compounds are known and can be made by conventional means. Nonionic surfactants, useful as anti-rust additives in the oleaginous compositions of this invention, usually owe their surfactant properties to a number of weak stabilizing groups such as ether linkages. Nonionic anti-rust agents containing ether linkages can be made by alkoxylating organic substrates containing active hydrogens with an excess of the lower alkylene oxides (such as ethylene and propylene oxides) until the desired number of alkoxy groups have been placed in the molecule.

The preferred rust inhibitors are polyoxyalkylene polyols and derivatives thereof. This class of materials are commercially available from various sources: Pluronic Polyols from Wyandotte Chemicals Corporation; Polyglycol 112-2, a liquid triol derived from ethylene oxide and propylene oxide available from Dow Chemical Co.; and Tergitol, dodecylphenyl or monophenyl polyethylene glycol ethers, and Ucon, polyalkylene glycols and derivatives, both available from Union Carbide Corp. These are but a few of the commercial products suitable as rust inhibitors in the improved composition of the present invention.

In addition to the polyols per se, the esters thereof obtained by reacting the polyols with various carboxylic acids are also suitable. Acids useful in preparing these esters are lauric acid, stearic acid, succinic acid, and alkyl- or alkenyl-substituted succinic acids wherein the alkyl-or alkenyl group contains up to about twenty carbon atoms.

The preferred polyols are prepared as block polymers. Thus, a hydroxy-substituted compound, R—(OH)n (wherein n is 1 to 6, and R is the residue of a mono- or polyhydric alcohol, phenol, naphthol, etc.) is reacted with propylene oxide to form a hydrophobic base. This base is then reacted with ethylene oxide to provide a hydrophylic portion resulting in a molecule having both hydrophobic and hydrophylic portions. The relative sizes of these portions can be adjusted by regulating the ratio of reactants, time of reaction, etc., as is obvious to those skilled in the art. Thus it is within the skill of the art to prepare polyols whose molecules are characterized by hydrophobic and hydrophylic moieties which are present in a ratio rendering rust inhibitors suitable for use in any lubricant composition regardless of differences in the base oils and the presence of other additives.

If more oil-solubility is needed in a given lubricating composition, the hydrophobic portion can be increased and/or the hydrophylic portion decreased If greater oil-in-water emulsion breaking ability is required, the hydrophylic and/or hydrophobic portions can be adjusted to accomplish this.

Compounds illustrative of R—(OH)n include alkylene polyols such as the alkylene glycols, alkylene triols, alkylene tetrols, etc., such as ethylene glycol, propylene glycol, glycerol, pentaerythritol, sorbitol, mannitol, and the like. Aromatic hydroxy compounds such as alkylated mono- and polyhydric phenols and naphthols can also be used, e.g., heptylphenol, dodecylphenol, etc.

Other suitable demulsifiers include the esters disclosed in U.S. Pat. Nos. 3,098,827 and 2,674,619.

The liquid polyols available from Wyandotte Chemical Co. under the name Pluronic Polyols and other similar polyols are particularly well suited as rust inhibitors. These Pluronic Polyols correspond to the formula:

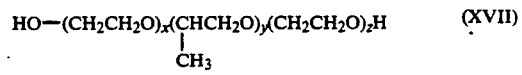

$$\text{HO}-(\text{CH}_2\text{CH}_2\text{O})_x(\text{CHCH}_2\text{O})_y(\text{CH}_2\text{CH}_2\text{O})_z\text{H} \quad \text{(XVII)}$$
$$|$$
$$\text{CH}_3$$

wherein x,y, and z are integers greater than 1 such that the $CH_2CH_2O$— groups comprise from about 10% to about 40% by weight of the total molecular weight of the glycol, the average molecule weight of said glycol being from about 1000 to about 5000. These products are prepared by first condensing propylene oxide with propylene glycol to produce the hydrophobic base

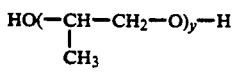
(XVIII)

This condensation product is then treated with ethylene oxide to add hydrophylic portions to both ends of the molecule. For best results, the ethylene oxide units should comprise from about 10 to about 40% by weight of the molecule. Those products wherein the molecular weight of the polyol is from about 2500 to 4500 and the ethylene oxide units comprise from about 10% to about 15% by weight of the molecule are particularly suitable. The polyols having a molecular weight of about 4000 with about 10% attributable to ($CH_2CH_2O$) units are particularly good. Also useful are alkoxylated fatty amines, amides, alcohols and the like, including such alkoxylated fatty acid derivatives treated with $C_9$ to $C_{16}$ alkyl-substituted phenols (such as the mono- and di-heptyl, octyl, nonyl, decyl, undecyl, dodecyl and tridecyl phenols), as described in U.S. Pat. No. 3,849,501, which is also hereby incorporated by reference in its entirety.

These compositions of our invention may also contain other additives such as those previously described, and other metal containing additives, for example, those containing barium and sodium.

The lubricating composition of the present invention may also include copper lead bearing corrosion inhibitors. Typically such compounds are the thiadiazole polysulphides containing from 5 to 50 carbon atoms, their derivatives and polymers thereof. Preferred materials are the derivatives of 1,3,4-thiadiazoles such as those described in U.S. Pat. Nos. 2,719,125; 2,719,126; and 3,087,932; especially preferred is the compound 2,5 bis (t-octadithio)-1,3,4-thiadiazole commercially available as Amoco 150. Other similar materials also suitable are described in U.S. Pat. Nos. 3,821,236; 3,904,537; 4,097,387; 4,107,059; 4,136,043; 4,188,299; and 4,193,882.

Other suitable additives are the thio and polythio sulphenamides of thiadiazoles such as those described in U.K. Patent Specification 1,560,830. When these compounds are included in the lubricating composition, we prefer that they be present in an amount from 0.01 to 10, preferably 0.1 to 5.0 weight percent based on the weight of the composition.

Some of these numerous additives can provide a multiplicity of effects, e.g. a dispersant-oxidation inhibitor. This approach is well known and need not be further elaborated herein.

Dispersants maintain oil insolubles, resulting from oxidation during use, in suspension in the fluid thus preventing sludge glocculation and precipitation or deposition on metal parts. Suitable dispersants include high molecular weight alkyl succinimides, the reaction product of oil-soluble polyisobutylene succinic anhydride with ethylene amines such as tetraethylene pentamine and borated salts thereof.

The ashless dispersants include the polyalkenyl or borated polyalkenyl succinimide where the alkenyl groups is derived from a $C_3$–$C_4$ olefin, especially polyisobutenyl having a number average molecular weight of about 700 to 5,000. Other well known dispersants include the oil soluble polyol esters of hydrocarbon substituted succinic anhydride, e.g., polyisobutenyl succinic anhydride, and the oil soluble oxazoline and lactone oxazoline dispersants derived from hydrocarbon substituted succinic anhydride and disubstituted amino alcohols. Lubricating oils typically contain about 0.5 to 5 wt. % of ashless dispersant.

Compositions when containing these conventional additives are typically blended into the base oil in amounts effective to provide their normal attendant function. Representative effective amounts of such additives (as the respective active ingredients) in the fully formulated oil are illustrated as follows:

| Compositions | Wt. % A.I. (Preferred) | Wt. % A.I. (Broad) |
|---|---|---|
| Viscosity Modifier | .01–4 | 0.01–12 |
| Detergents | 0.01–3 | 0.01–20 |
| Corrosion Inhibitor | 0.01–1.5 | .01–5 |
| Oxidation Inhibitor | 0.01–1.5 | .01–5 |
| Dispersant | 0.1–8 | .1–20 |
| Pour Point Depressant | 0.01–1.5 | .01–5 |
| Anti-Foaming Agents | 0.001–0.15 | .001–3 |
| Anti-Wear Agents | 0.001–1.5 | .001–5 |
| Friction Modifiers | 0.01–1.5 | .01–5 |
| Mineral Oil Base | Balance | Balance |

When other additives are employed, it may be desirable, although not necessary, to prepare additive concentrates comprising concentrated solutions or dispersions of the novel multifunctional viscosity index improvers of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the dispersants of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 to about 60% by weight additives in the appropriate proportions with the remainder being base oil.

The final formulations may employ typically about 10 wt. % of the additive-package with the remainder being base oil.

The amount of the multifunctional viscosity index improvers, e.g., viscosity index improvers-dispersants, of the present invention present in oleaginous compositions such as lubricating oil compositions is at least a viscosity index improving effective amount, i.e., an amount effective to improve the viscosity index of the oleaginous material. In the particular case of a viscosity index improver-dispersant the amount present is a viscosity index improving and dispersant effective amount, i.e., an amount effective to improve the viscosity index of the oleaginous material and to impart dispersance properties to said composition. Generally, these amounts are usually from about 0.01 to about 20 wt. %, preferably from about 0.05 to about 15 wt. %, more preferably from about 0.1 to about 12 wt. %, and most preferably from about 0.25 to about 6 wt. %, of the total composition.

All of said weight percents expressed herein (unless otherwise indicated) are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all parts are parts by weight, unless otherwise noted and which include preferred embodiments of the invention.

EXAMPLE 1

Preparation of Ethylene Propylene Copolymer

A clean, dry autoclave is flushed with propylene and a 4 ml. solution of methylalumoane in toluene is added by syringe. The autoclave is then charged with 500 ml. of liquid propylene and brought to 50° C. for reaction. The pressure in the autoclave is then increased by 150 psi by addition of ethylene. One-half mg. of zirconocene (bis(n-butyl tetrahydroindenyl)zirconium dichloride) dissolved in 3 ml. of toluene is injected into the autoclave. Ethylene is supplied to maintain the initial total pressure in the autoclave. Reaction time is 30 minutes. The monomers are flashed off, and the temperature is brought to 25° C. The polymer product, which has a number average molecular weight in the range of about 209,000, is recovered from the autoclave and is dried in a vacuum oven at 50° C. overnight.

EXAMPLE 2

Alkylation of Phenol

About 50 g. of ethylene-propylene copolymer is prepared substantially in accordance with the procedure of Example 1 is dissolved in 200 ml of chlorobenzene and added to a solution containing 10.45 g. of phenol in 200 ml of chlorobenzene. While stirring at room temperature under a nitrogen blanket, 0.5 g. of BF3 gas is bubbled into the charged solution, and the reaction mixture is stirred while the temperature is increased to 50° C. for about 1 hour. The reaction mixture is then neutralized with gaseous ammonia until a neutral pH is obtained. The solution is filtered and the filtrate is heated to 150° C. to distill of the solvent and excess phenol.

EXAMPLE 3

Mannich Base Condensation

Twenty-five grams of the alkylated phenol which is prepared substantially in accordance with the procedure of Example 2 is dissolved in 200 g. of S150N lubricating oil. To the solution is added 0.61 g. of 1,6-hexanediamine and 0.35 g. of formaldehyde at 30° C. under $N_2$. The mixture is heated to 115° C. and kept at that temperature for 1 hour in a four necked round bottomed flask. Then, the reaction mixture's temperature is raised to 130° C. while the reaction vessel is swept with dry $N_2$ gas for 45 minutes. The stripped reaction mixture is then cooled to room temperature, diluted with 100 ml. of heptane, and filtered. The filtrate is then stripped at 130° C. with dry $N_2$ gas to remove heptane.

EXAMPLE 4

An SAE 10W40 formulation crankcase motor oil composition is prepared by dissolving sufficient Mannich Base Condensation product which is prepared substantially in accordance with the procedure of Example 3 in mineral oil to provide a composition containing 1.3 wt. % (active ingredient) of said Mannich Base condensation product. The oil also contains 4.3 wt. % of a detergent inhibitor package of conventional additives.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A composition useful as a multifunctional viscosity index improver additive in oleaginous compositions which comprises condensation product of:

(a) at least one alkyl-substituted hydroxyaromatic compound formed by the alkylation of at least one unsaturated ethylene alpha-olefin polymer of from greater than 25,000 to about 500,000 number average molecular weight, said polymer containing from 30 to 80 weight percent ethylene and at least 30% of the polymer's chains contain terminal ethenylidene unsaturation, wherein said hydroxyaromatic compound is represented by the formula:

$$H-AR-(OH)_c$$

wherein Ar is selected from the group consisting of:

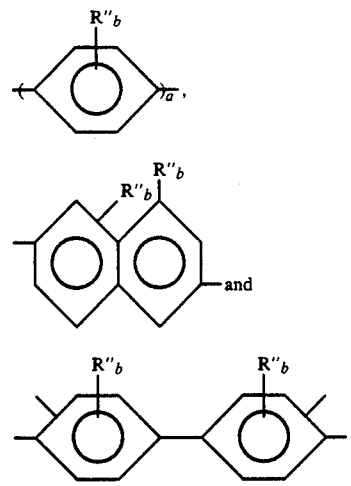

wherein a is 1 or 2, R" is independently a halogen radical or a hydrocarbyl radical containing from 1 to about 10 carbon atoms, b is independently an integer from 0 to 2, and c is an integer from 1 to 2;

(b) at least one aldehyde reactant selected from the group consisting of:
1. paraformaldehyde,
2. $C_2$ to $C_{10}$ hydrocarbyl aldehyde, and
3. aldehyde compounds of the formula:

$$R^{12}CHO$$

wherein $R^{12}$ is H or an aliphatic hydrocarbon radical having 1 to 4 carbon atoms; and
(c) at least one nucleophilic reactant.

2. The composition of claim 1 wherein said polymer comprises an ethylene-propylene copolymer.

3. The composition of claim 1 wherein said copolymer has a number average molecular weight of from about 25,000 to about 200,000.

4. The composition of claim 3 wherein said number average molecular weight is between about 30,000 and 100,000.

5. The composition of claim 1 wherein said polymer has a molar ethylene content of between about 20 and about 80 percent.

6. The composition of claim 5 wherein said polymer has a molar ethylene content of between about 45 and about 65 percent.

7. The composition of claim wherein said hydroxy aromatic compound comprises phenol.

8. The composition of claim 1 wherein the nucleophilic reagent comprises an amine containing from 2 to carbon atoms and from 1 to 12 nitrogen atoms per molecule.

9. The composition to claim 8 wherein said amine comprises a polyalkylenepolyamine wherein said alkylene group contains 2 to 60 carbons and said polyalkylenepolyamine contains from 2 to about 9 nitrogen atoms per molecule.

10. The composition of claim 9 wherein said amine comprises polyethylenepolyamine.

11. The composition of claim 8 wherein said aldehyde reactant comprises formaldehyde.

12. The composition of claim 11 wherein said hydroxy aromatic compound comprises phenol.

13. The composition of claim 1 wherein said aldehyde reactant comprises formaldehyde.

14. An oil concentrate containing from about 5 to 60 weight percent of the composition of claim 1.

15. An oil concentrate containing from about 10 to 60 weight percent of the composition of claim 2.

16. A lubricating oil composition containing from about 0.01 to 20 weight percent of the composition of any of claims 1 or 2.

17. A lubricating oil composition of claim 16 containing from about 0.1 to 12 weight percent of said composition.

18. An aromatic compound useful as an oleaginous composition additive which comprises alkyl-substituted hydroxyaromatic compound formed by the alkylation of at least one hydroxy aromatic compound with an ethylene alpha-olefin polymer from about 25,000 to about 500,000 number average molecular weight, said polymer containing from 30 to 80 weight percent ethylene and wherein at least 30% of the polymer's chain contains terminal ethenylidene unsaturation, and wherein said hydroxyaromatic compound is represented by the formula:

H—Ar—(OH)$_c$ wherein Ar is selected from the group consisting of:

-continued

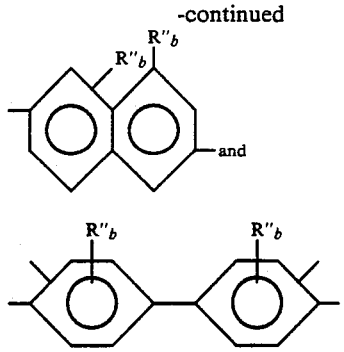

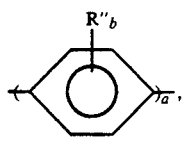

wherein a is 1 or 2, R" is independently a halogen radical or a hydrocarbyl radical containing from 1 to about 10 carbon atoms, b is independently an integer from 0 to 2, and c is an integer from 1 to 2.

19. The aromatic compound of claim 18 wherein said polymer comprises ethylene-propylene copolymer.

20. The aromatic compound of claim 19 wherein said polymer has a number average molecular weight of between about 25,000 and about 200,000.

21. The aromatic compound of claim 20 wherein said number average molecular weight is between about 30,000 and 100,000.

22. The aromatic compound of claim 18 wherein at least 60% of the polymer's chains contain terminal ethenylidene unsaturation.

23. The aromatic compound of claim 18 wherein said polymer has a molar ethylene content of between about and about 80 percent.

24. The aromatic compound of claim 23 wherein said polymer has a molar ethylene content of between about 45 and about 65 percent.

25. The aromatic compound of claim 18 wherein said hydroxy aromatic compound comprises phenol.

26. An oil concentrate containing from about 5 to about 60 weight percent of the hydroxy aromatic compound of claim 18.

27. An oil concentrate containing from about 10 to about 60 weight percent of the hydroxy aromatic compound of claim 18.

28. A lubricating oil composition containing a multifunctionl viscosity index improving effective amount of the hydroxy aromatic compound of claim 18.

29. The lubricating composition of claim 28 containing from about 0.01 to about 20 weight percent of said hydroxy aromatic compound.

30. The lubricating composition of claim 29 containing from about 0.1 to about 12 weight percent of said hydroxy aromatic compound.

31. The composition of either of claims 1 and 18 wherein said polymer is prepared in the presence of a catalyst system comprising at last one metallocene and an alumoxane compound.

32. The metallocene of claim 31, wherein said metallocene is a metal derivative of cyclopentadiene.

33. The metal derivative of cyclopentadiene of claim 32, wherein said metal derivative of cyclopentadiene is selected from the group comprising titanium, zirconium and haphnium.

34. The metallocene of claim 31, wherein said metallocene is represented by the formula from the group comprising:

a. (Cp)$_m$MR$_n$X$_q$ wherein Cp is a cyclopentadienyl ring, M is a Group 4b transition metal, R is a hydrocarbyl group or hydrocarboxy group having from 1 to 20 carbon atoms, X is a halogen, and m is a whole number from 1 to 3, n is a whole number from 0 to 3, and q is a whole number from 0 to 3;

b. $(C_5R'_k)_g R''_s (C_5R'_k) MQ_{3-g}$ and
c. $R''_s (C_5R'_k)_2 MQ'$ wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carton atoms, a silicon containing hydrocarbyl radical, or hydrocarbyl radicals wherein two carbon atoms are joined together to form a $C_4$-$C_6$ ring, R'' is a $C_1$-$C_4$ alkylene radical, a dialkyl germanium or silicon, or a alkyl phosphine or amine radical bridging two $(C_5R'_k)$ rings, Q is a hydrocarbyl radical such as aryl, alkyl, alkenyl, alkylaryl, or aryl alkyl radical having from 1–20 carbon atoms, hydrocarboxy radical having from 1–20 carbon atoms or halogen and can be the same or different from each other, Q' is an alkylidene radical having from 1 to about 20 carbon atoms, s is 0 or 1, g is 0, 1 or 2, s is 0 when g is 0, k is 4 when s is 1, and k is 5 when s is 0, and M is as defined above.

* * * * *